(12) United States Patent
Azuma et al.

(10) Patent No.: US 12,049,070 B2
(45) Date of Patent: Jul. 30, 2024

(54) LAMINATED STRUCTURE

(71) Applicant: ASAHI KASEI KABUSHIKI KAISHA, Tokyo (JP)

(72) Inventors: Naoki Azuma, Tokyo (JP); Tetsuo Nakamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 454 days.

(21) Appl. No.: 17/266,615

(22) PCT Filed: Aug. 1, 2019

(86) PCT No.: PCT/JP2019/030279
§ 371 (c)(1),
(2) Date: Feb. 8, 2021

(87) PCT Pub. No.: WO2020/031854
PCT Pub. Date: Feb. 13, 2020

(65) Prior Publication Data
US 2021/0291484 A1  Sep. 23, 2021

(30) Foreign Application Priority Data
Aug. 9, 2018 (JP) ................................. 2018-150147

(51) Int. Cl.
*B32B 5/18* (2006.01)
*B32B 27/06* (2006.01)
(Continued)

(52) U.S. Cl.
CPC .............. *B32B 5/18* (2013.01); *B32B 27/065* (2013.01); *C08J 9/0061* (2013.01); *C08J 9/122* (2013.01);
(Continued)

(58) Field of Classification Search
CPC ............. B32B 1/00; B32B 1/08; B32B 15/02; B32B 15/046; B32B 15/18; B32B 15/20;
(Continued)

(56) References Cited

U.S. PATENT DOCUMENTS 4,022,856 A * 5/1977 Maxey .................... B29C 67/20
264/45.3
2002/0182399 A1  12/2002 Tokoro et al.
(Continued)

FOREIGN PATENT DOCUMENTS

CN          1468705 A       1/2004
CN          110139894 A     8/2019
(Continued)

OTHER PUBLICATIONS

Feb. 9, 2021, International Preliminary Report on Patentability issued in the International Patent Application No. PCT/JP2019/030279.

(Continued)

*Primary Examiner* — Yan Lan
(74) *Attorney, Agent, or Firm* — KENJA IP LAW PC

(57) ABSTRACT

The present disclosure provides a laminated structure with a through hollow structure having heat insulation, a light weight, durability, and sound absorption performance to reduce wind noise, transmitted noise, and the like. The laminated structure of the present disclosure has a foamed resin layer having continuous pores containing fused resin foam particles, and an air-impermeable outer layer provided on one side of the foamed resin layer, where a part of the foamed resin layer of the laminated structure cut out with a diameter of 41.5 mm$\phi$ has an amount of air permeability of 2.5 cm$^3$/(cm$^2$·s) to 40 cm$^3$/(cm$^2$·s) measured by the Frazier method in which the foamed resin layer is set as an air introduction side.

12 Claims, 6 Drawing Sheets

(51) Int. Cl.
*C08J 9/00* (2006.01)
*C08J 9/12* (2006.01)
*C08J 9/35* (2006.01)
*C08J 9/36* (2006.01)
*F16L 55/033* (2006.01)

(52) U.S. Cl.
CPC ............... *C08J 9/35* (2013.01); *C08J 9/36* (2013.01); *B32B 2307/7244* (2013.01); *B32B 2605/00* (2013.01); *C08J 2201/03* (2013.01); *C08J 2203/06* (2013.01); *C08J 2323/12* (2013.01); *C08J 2367/02* (2013.01); *C08J 2371/12* (2013.01); *C08J 2377/02* (2013.01); *C08J 2425/06* (2013.01); *F16L 55/0336* (2013.01)

(58) Field of Classification Search
CPC ............ B32B 2250/02; B32B 2250/24; B32B 2266/0214; B32B 2266/0242; B32B 2266/025; B32B 2266/0257; B32B 2266/0264; B32B 2307/718; B32B 2307/72; B32B 2307/7242; B32B 2307/7244; B32B 2307/734; B32B 2307/746; B32B 2457/00; B32B 2605/00; B32B 2605/08; B32B 2605/18; B32B 27/065; B32B 27/08; B32B 27/285; B32B 27/30; B32B 27/308; B32B 27/32; B32B 27/34; B32B 27/36; B32B 27/365; B32B 3/10; B32B 3/20; B32B 3/26; B32B 5/18; B32B 5/20; C08J 2201/03; C08J 2203/06; C08J 2323/12; C08J 2367/02; C08J 2371/12; C08J 2377/02; C08J 2425/06; C08J 9/0061; C08J 9/122; C08J 9/35; C08J 9/36; F16L 55/0336
See application file for complete search history.

(56) References Cited

U.S. PATENT DOCUMENTS

| | | |
|---|---|---|
| 2007/0289689 A1 | 12/2007 | Sugimoto et al. |
| 2013/0316102 A1 | 11/2013 | Yoshida |
| 2018/0170148 A1 | 6/2018 | Unno et al. |
| 2020/0032023 A1 | 1/2020 | Nakamoto |

FOREIGN PATENT DOCUMENTS

| | | |
|---|---|---|
| EP | 1016511 A1 | 7/2000 |
| EP | 1378343 A2 | 1/2004 |
| EP | 3581613 A1 | 12/2019 |
| JP | S63309434 A | 12/1988 |
| JP | H04185328 A | 7/1992 |
| JP | H04266942 A | 9/1992 |
| JP | H08108441 A | 4/1996 |
| JP | H10238426 A | 9/1998 |
| JP | H10329220 A | 12/1998 |
| JP | H11207759 A | 8/1999 |
| JP | 3377575 B2 | 2/2003 |
| JP | 2003081028 A | 3/2003 |
| JP | 2004042649 A | 2/2004 |
| JP | 2007192262 A | 8/2007 |
| JP | 2014005823 A | 1/2014 |
| WO | 2015083447 A1 | 6/2015 |

OTHER PUBLICATIONS

Sep. 10, 2019, International Search Report issued in the International Patent Application No. PCT/JP2019/030279.

Aug. 18, 2021, the Supplementary European Search Report issued by the European Patent Office in the corresponding European Patent Application No. 19847481.9.

\* cited by examiner (a1)

(e1)

(a2)

(e2)

LAMINATED STRUCTURE

TECHNICAL FIELD

This disclosure relates to a laminated structure. More specifically, this disclosure relates to a laminated structure having an air-impermeable outer layer and an air-permeable resin layer having continuous pores formed of a foamed resin containing resin foam particles having a specific shape.

BACKGROUND

Resin foam materials are being used as structural materials for components of automobiles and electronic devices and for containers in place of conventional solid resin materials and metal materials. These resin foam materials have features such as low density, high heat insulation, and shock absorption, and it is mainly these characteristics that are effectively exploited.

Particularly for automobiles, resinification of parts and practical implementation of resin foams have been studied from the viewpoint of fuel efficiency. In recent years, there has been an increasing demand for reducing acceleration noise, and there has been a demand for sound absorption and sound insulation measures in engine rooms that generate noise and a movement to reduce wind noise of ventilation components for air intake and exhaust. However, the temperature inside the engine room is high, so that heat resistance is required. Additionally, the space inside the engine room is very narrow, so that the sound absorbing material may come into close contact with the engine due to vibration during driving, in which case it may be deteriorated or melted by heat, if it is not a self-supporting sound absorbing material. Moreover, in that case, the distance from a sound source changes, so that the initial sound absorption performance cannot be maintained. Furthermore, although EVs are being put to practical use considering the noise, there also are high demands on ventilation components for intake and exhaust, which are mounted on EVs for cooling batteries, in terms of weight reduction, heat insulation from heat generated by motors, inverters and the like, and reduction of wind noise.

In particular, the noise called wind noise in the ventilation components for intake and exhaust is mostly generated in a low-frequency region around 1,000 Hz to 2,000 Hz. Conventional sound absorbing materials cannot provide adequate sound absorption performance and sound insulation performance, so that a muffler is attached to reduce noise, which requires space and increase the cost of the ventilation components.

Characteristics such as weight reduction and heat insulation are anticipated for resin foam materials, but as for sound absorption and sound insulation, the scope of use has been limited.

The reason for this is that sound absorption and sound insulation are not characteristics that are displayed by all foams and these characteristics are dependent on the cell structure. Foams having a closed cell structure, which is a structure in which adjacent cells in the foam structure are separated by walls of resin, have excellent rigidity and mechanical strength, but extremely low sound absorption and sound insulation performance. In contrast, foams having an open cell structure in which cell walls have broken or disappeared have excellent sound absorption and sound insulation performance, but poor rigidity and mechanical strength. Thus, such attributes tend to conflict with one another, which makes it difficult to achieve these attributes together.

Urethane resin and melamine resin are examples of open cell resin foams and the main uses thereof are for sponges that absorb fluids and for cushioning materials that exploit the flexibility and shock absorption performance thereof. These resins are also widely used as sound absorbing materials due to displaying excellent sound absorption and being light compared to inorganic materials. However, the low rigidity and compressive strength of these resins means that they are mainly used as constituent materials of laminates with other structural materials, rather than as structural materials, where the other structural materials bear all the strength. This is good in terms of heat insulation and sound absorption, but insufficient in weight reduction.

Next, known examples of structures and laminated structures having a through hollow structure such as ventilation components include a foam structure using foam blowing, and a laminated structure in which an unfoamed layer and a foamed layer are laminated through unfoamed and foamed laminate blow shaping.

WO 2015/083447 A (PTL 1) describes a foam shaped product in a tubular shape that is formed by foam blow shaping and has excellent heat insulation and sound deadening properties, where the mass per unit area, the expansion ratio, and the closed cell ratio of the foam shaped product are specified.

JP H10-238426 A (PTL 2) describes an intake pipe having a sound deadening function, which is a hollow multilayer body having an innermost layer as a foam layer and having an enlarged diameter portion with an inner diameter larger than an inner diameter of a main body, where an innermost layer of the enlarged diameter portion has an open cell structure. JP 2007-192262 A (PTL 3) describes a ventilation component of a laminate, where the ventilation component has an expansion portion, the expansion portion is in a main body of the ventilation component, and a foam is attached thereto to provide sound deadening performance.

JP H11-207759 A (PTL 4) describes a foam shaped product with a skin that has sound absorption performance, which is obtained by mounting a skin material in a mold, and then heating particles, chips, and crushed materials with steam and welding them to the skin material, where the particles, chips, and crushed materials have a shape made of a thermoplastic foam of a spatial ratio of 45% or more in the mold.

CITATION LIST

Patent Literature

PTL 1: WO 2015/083447 A
PTL 2: JP H10-238426 A
PTL 3: JP 2007-192262 A
PTL 4: JP H11-207759 A

SUMMARY

Technical Problem

The foam shaped product described in PTL 1 is formed by foam blow shaping and has a high closed cell ratio, so that the sound absorption performance is inadequate.

The intake pipe having a sound deadening function described in PTL 2 has an open cell structure, and the open cell structure is obtained by a method of bursting the cells during foam blow shaping. This method bursts the cells on the inner surface layer but does not burst the cells inside, resulting in an incomplete open cell structure and inadequate sound absorption performance.

The ventilation component of a laminate described in PTL 3 uses a urethane foam, which is an open cell foam, to obtains high sound absorption performance. Since the urethane foam has a low strength, the thickness of the base material of the ventilation component cannot be reduced, which is insufficient in terms of weight reduction. Moreover, the urethane is scraped off as air passes through, which causes shape deformation. As a result, the sound absorption performance deteriorates with time.

The foam shaped product with a skin described in PTL 4 can improve the weakness of durability of the urethane foam described in PTL 3. However, the performance of the foam shaped product is evaluated when the thickness of the whole laminated structure is larger than 40 mm, and it is unclear whether the performance of the laminated structure is good when the thickness of the whole laminated structure is small. Moreover, it is known that the sound absorption performance and the sound insulation performance are affected not only by the porosity but also by the size of the pores and the complexity of the pores, so that it is insufficient to control the sound absorption performance and the sound insulation performance only by the porosity.

As in PTLS 1 to 4 described above, a shaped product or a shaped product of a ventilation component that satisfies all of heat insulation, sound absorption, light weight, and durability has not been provided.

It could thus be helpful to provide a laminated structure that has heat insulation performance, a light weight and durability, and has sound absorption performance and sound insulation performance to reduce wind noise, transmitted noise, and the like.

Solution to Problem

As a result of diligent investigation conducted with the aim of solving the problems set forth above, we discovered that, surprisingly, by using a laminated structure having an air-impermeable outer layer and a foamed resin layer containing a novel resin foam shaped product that has connected pores with a specific structure and that is formed by a process of thermally fusing resin foam particles having a specific shape, it is possible to obtain a ventilation component or a structure that can serve as a ventilation component having all of heat insulation performance, sound absorption performance, sound insulation performance, light weight, durability, and strength. In this manner we completed the present disclosure.

We thus provide the following.

[1] A laminated structure comprising
a foamed resin layer having continuous pores containing fused resin foam particles, and
an air-impermeable outer layer provided on one side of the foamed resin layer, wherein
a part of the foamed resin layer of the laminated structure cut out with a diameter of 41.5 mmϕ has an amount of air permeability of 2.5 cm$^3$/(cm$^2$·s) to 40 cm$^3$/(cm$^2$·s) measured by the Frazier method in which the foamed resin layer is set as an air introduction side.

[2] The laminated structure according to [1], wherein the resin foam particles have a recessed external part.

[3] The laminated structure according to [1] or [2], wherein the foamed resin layer has a porosity of 15% to 80%.

[4] The laminated structure according to any one of [1] to [3], wherein the laminated structure contains a thermoplastic resin having a surface tension of 37 mN/m to 60 mN/m at 20° C.

[5] The laminated structure according to any one of [1] to [4], wherein the foamed resin layer comprises a shaped body which contains the resin foam particles having an average particle diameter of 1.0 mm to 4.0 mm, where a ratio $\rho_0/\rho_1$ of a density $\rho_0$ of the resin and a true density $\rho_1$ of the resin foam particles is 2 to 20, a ratio $\rho_1/\rho_2$ of a true density $\rho_1$ of the resin foam particles and a bulk density $\rho_2$ of the resin foam particles is 1.5 to 4.0, and the resin foamed particles are fused to one another.

[6] The laminated structure according to any one of [1] to [5], wherein either or both of the air-impermeable outer layer and the foamed resin layer contain at least one resin selected from the group consisting of heat-resistant acrylic resin, polyester-based resin, polycarbonate, polypropylene resin, polyphenylene ether resin, and polyamide resin.

[7] The laminated structure according to any one of [1] to [6], wherein the air-impermeable outer layer comprises an air-impermeable resin containing no foamed resin.

[8] A hollow laminated structure, comprising an air-impermeable resin outer layer containing an unfoamed resin, and a foamed resin inner layer having continuous pores containing resin foam particles.

[9] The laminated structure according to any one of [1] to [8], wherein the air-impermeable outer layer and the foamed resin layer are partially adhered to one another.

[10] The laminated structure according to any one of [1] to [9], wherein the air-impermeable outer layers and the foamed resin layers have a welded portion.

[11] The laminated structure according to any one of [1] to [10], which is a hollow structure for automobiles.

[12] The laminated structure according to any one of [1] to [11], wherein the air-impermeable outer layer is the exterior of an automobile.

[13] The laminated structure according to any one of [1] to [12], which is a cover for automotive power or automotive electronics.

Advantageous Effect

According to the present disclosure, it is possible to provide a durable laminated structure having high heat insulation, a light weight, a high strength, and having both sound absorption performance and sound insulation performance.

DETAILED DESCRIPTION

Figure 1:
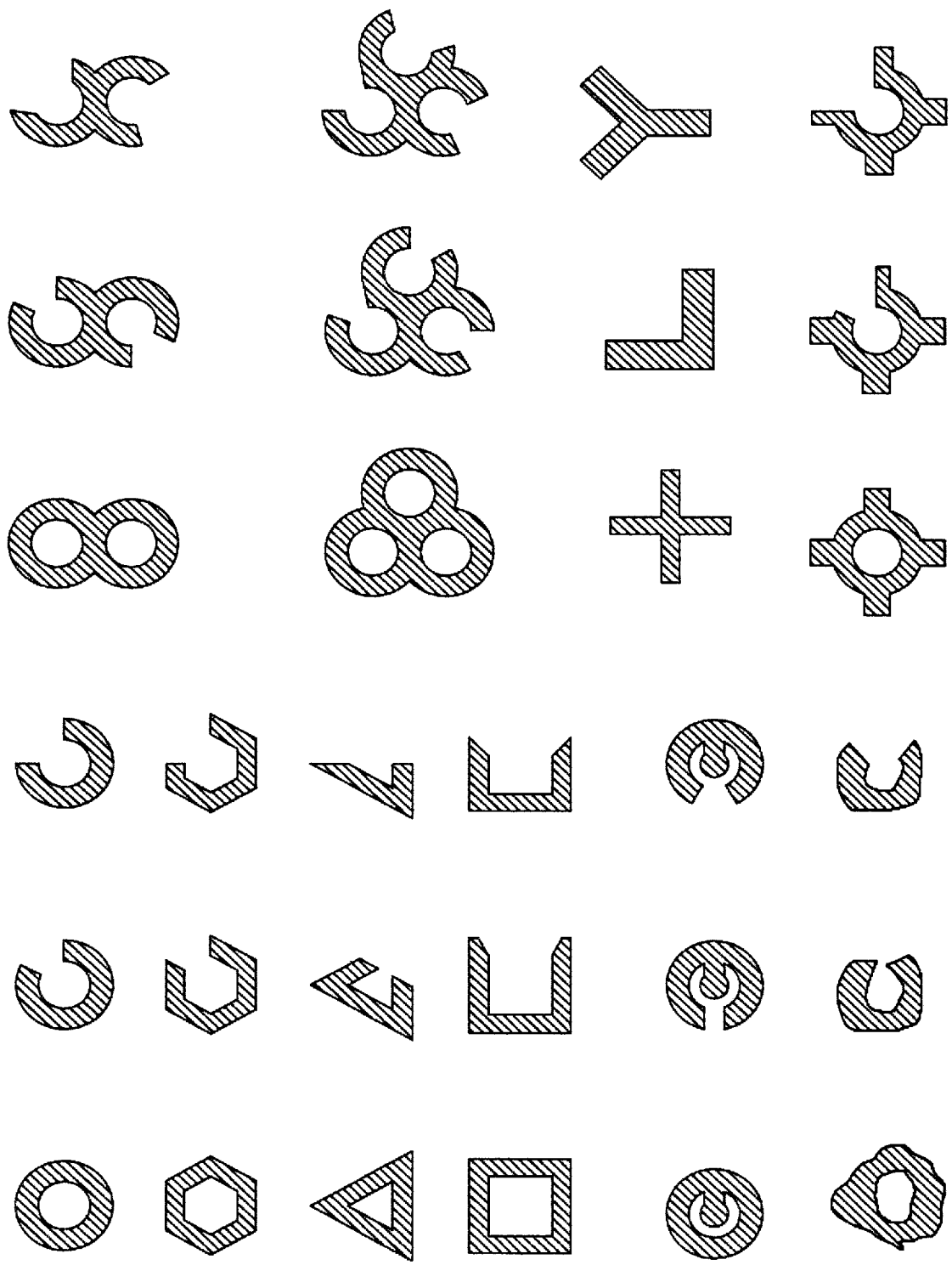
FIG. 1 illustrates examples of cross-sectional views of resin foam particles used in a laminate of a present embodiment.

The shape of a laminated structure having a hollow structure of a present embodiment may be various shapes such as a flat plate shape or an R shape, or may be a through hollow shape. In this case, the outside of the hollow shape is preferably an air-impermeable outer layer, and the inside of the hollow shape is preferably a foamed resin layer. The vertical section of the hollow structure has various shapes depending on location and application in which the structure is to be used, such as a round shape, an elliptical shape, a square shape, a rectangular shape, a triangular shape, and a trapezoidal shape. It may also be a combination of these shapes. There are no restrictions on the length direction, and it may be in a straight line or in a shape including one or more elbows.

The diameter of the hollow laminated structure is not particularly limited in terms of the outer diameter or the inner diameter, and various sizes may be used. The diameter may increase or decrease in the middle.

From a viewpoint of obtaining an excellent balance of sound absorption performance, sound insulation performance, rigidity, and strength with light weight, the thickness of the laminated structure of the present embodiment is 3 mm to 80 mm, preferably 5 mm to 50 mm, and more preferably 5 mm to less than 40 mm. Especially for automobiles, the laminated structure is preferably thin and with good performance because the space is limited.

The laminated structure of the present embodiment has at least an air-impermeable outer layer and a foamed resin layer with continuous pores containing resin foam particles, and may have another layer in the middle.

The air-impermeable outer layer of the present embodiment is preferably a resin, which may be the same resin as the foamed resin of the inner layer or may be a different one. Each of them may be composed of two or more different resins. However, it is preferably the same resin from the viewpoint of the adhesion of the interface and the coefficient of linear expansion. Examples of the resin include a thermoplastic resin.

Examples of the thermoplastic resin include styrene-based polymers such as polystyrene, poly α-methylstyrene, styrene-maleic anhydride copolymer, a blend or graft polymer of polyphenylene oxide and polystyrene, acrylonitrile-styrene copolymer, acrylonitrile-butadiene-styrene terpolymer, styrene-butadiene copolymer and high impact polystyrene, vinyl chloride-based polymers such as polyvinyl chloride, vinyl chloride-vinyl acetate copolymer, post-chlorinated polyvinyl chloride, and copolymer of vinyl chloride and ethylene or propylene, polyvinylidene chloride-based copolymer resin, nylon 6, nylon 6,6, homopolymerized or copolymerized polyamide resin, polyethylene terephthalate and polybutylene terephthalate and their homopolymerized or copolymerized polyester-based resin, modified polyphenylene ether resin (phenylene ether-polystyrene alloy resin), and polycarbonate resin, examples of a heat-resistant acrylic resin include methyl methacrylate-(meta) acrylic resin, methacrylimide resin and acryl-maleic anhydride-styrene resin, and other resins such as polyphenylene sulfide, polysulfone, polyether sulfone, polyester-based resin, phenolic resin, urethane resin, and polyolefin-based resin such as polypropylene resin or polyethylene resin.

Polypropylene-based resins, such as polypropylene, ethylene-propylene random copolymer, propylene-butene random copolymer, ethylene-propylene block copolymer and ethylene-propylene-butene terpolymer, and polyethylene-based resins, such as low-density polyethylene, medium-density polyethylene, linear low-density polyethylene, linear ultra-low-density polyethylene, high-density polyethylene, ethylene-vinyl acetate copolymer, ethylene-methyl methacrylate copolymer and ionomer resin, that are polymerized using a Ziegler catalyst, a metallocene catalyst, or the like may be used individually or in a mixed form as the polyolefin-based resin.

Particularly preferable examples of the thermoplastic resin are heat-resistant acrylic resin, polyester-based resin, polycarbonate, polypropylene resin, polyphenylene ether resin, and polyamide resin. The thermoplastic resin is more preferably a thermoplastic resin having a surface tension within any of the ranges set forth above. Among these examples, polyamide resin, polypropylene resin, and polyester-based resin are examples of resins having excellent heat resistance, chemical resistance, and solvent resistance that is suitable for high heat resistance foam structural materials.

The surface tension of the resin at 20° C. is preferably 37 mN/m to 60 mN/m and more preferably 38 mN/m to 55 mN/m. This is particularly preferable because a resin foam shaped product that displays sound absorption and has high mechanical strength can be obtained when the surface tension is within any of the ranges set forth above.

The surface tension of the resin is taken to be a value measured by a method in which the temperature in the method described in JIS K6768 "Plastics-Film and Sheeting-Determination of Wetting Tension" is changed to 20° C.

The thermoplastic resin may be used in a non-crosslinked state or may be used after being crosslinked by a peroxide, radiation, or the like.

The thermoplastic resin may, depending on the objective, contain typical compounding agents such as an antioxidant, a light stabilizer, an ultraviolet absorber, a flame retardant, a colorant such as dye and pigment, a plasticizer, a lubricant, a crystallization nucleating agent, an inorganic filler such as talc and calcium carbonate, and glass fiber or carbon fiber for maintaining strength.

Examples of a flame retardant that can be used include those based on bromine and phosphorus, examples of an antioxidant that can be used include those based on phenol, phosphorus and sulfur, and examples of a light stabilizer that can be used include those based on hindered amines and benzophenone.

(Air-Impermeable Outer Layer)

The following describes the air-impermeable outer layer of the laminate of the present embodiment.

Various materials may be used for the air-impermeable outer layer, and the material may be a metal such as iron, stainless steel, copper, nickel, and aluminum. It may also be a thermoplastic resin or a thermosetting resin. Among the examples, when a thermoplastic resin is used, the air-impermeable outer layer can be produced by a commonly known method such as common injection molding, press molding, or blow molding. There is no need to produce the air-impermeable outer layer into a seamless integral layer, and the air-impermeable outer layer may be obtained by dividing it into a plurality of pieces, producing each piece, and joining the pieces to form one air-impermeable outer layer. The joining method may be a commonly known method such as a vibration welding method, a hot plate welding method, an ultrasonic welding method, and a joining method using an adhesive.

When a thermosetting resin is used, the air-impermeable outer layer is obtained by using a mold having a gap, whose thickness is equal to that of the air-impermeable resin outer layer, provided on the outside of the resin inner layer, which will be described later, pouring a thermosetting resin raw material into the gap, and curing the resin by the heat of the mold.

The thickness of the resin outer layer of the present embodiment is preferably 0.3 mm to 5 mm, 0.5 mm to 4 mm, and more preferably 0.8 mm to 3.5 mm.

Since the resin inner layer has continuous pores, the resin outer layer of the present embodiment should be impermeable to air considering the prevention of intrusion of liquids such as water and oil from the outside and the efficiency of air inflow when used as a ventilation component. The term "air-impermeable" means that the unit length flow resistance of a flat shaped product measured using the AC method of International Standard ISO 9053 is larger than 200,000 N·s/m$^4$. The unit length flow resistance is more preferably 220,000 N·s/m$^4$. A shaped product obtained by common injection molding is impermeable to air.

The air-impermeable outer layer may include an air-impermeable resin containing no foamed resin.

As used herein, the phrase "containing no foamed resin" means that the air-impermeable resin contains less than five pores with an average diameter of 100 μm or more per 1 cm$^3$.

(Foamed Resin Layer)

The foamed resin layer of the laminated structure of the present embodiment contains a foamed resin (2) with continuous pores containing fused resin foam particles. The foamed resin (2) is preferably a resin foam shaped product that is obtained through fusion and shaping of resin particles and that contains resin foam particles. By containing resin foam particles, weight reduction and heat insulation can be realized. The foamed resin layer may be a mixture of unfoamed resin particles and resin foam particles, but it is preferably composed only of resin foam particles from the viewpoint of shaping properties and heat insulation. In addition to the resin foam particles, the foamed resin layer may contain additives such as inorganic or organic particles, a flame retardant, and a stabilizer.

The thickness of the foamed resin layer is preferably 2 mm to less than 80 mm, more preferably 3 mm to less than 50 mm, and still more preferably 5 mm to less than 40 mm from a viewpoint of obtaining an excellent balance of sound absorption performance, rigidity, and strength with light weight.

The resin foam particles used in the present embodiment may be resin foam particles having various shapes, among which resin foam particles having a recessed external part (i.e., resin foam particles having a recessed part in the exterior thereof as viewed from at least one direction) are preferred. In another embodiment, the particles may be a mixture of unfoamed resin particles having a recessed external part and foamed resin foam particles. In this case, the shape of the resin foam particles is not particularly limited.

The phrase "having a recessed external part" as used in the present specification means that there is a direction for which an orthographic projection of a resin particle is a recessed geometric shape. The term "recessed geometric shape" as used in the present specification means that it is possible to select two points on the outer surface of an orthographic projection geometric shape that constitutes this recessed geometric shape such that at least part of a line segment linking these points (preferably the whole line segment) is a line segment passing through a region external to the resin particle. Examples of the recessed geometric shape are illustrated in FIG. 1. Note that the recessed external part is a different structure to foam cells formed during foaming.

One recessed external part may be present or a plurality of recessed external parts may be present.

The recessed external part may be one or more through holes that connect surfaces of the resin particle, may be one or more recesses that do not pass through the particle, or may be a combination of one or more through holes and one or more recesses. Moreover, a through hole may be a cavity that links two holes formed at the outer surface the resin particle or may have a structure such that in an orthographic projection in which the cavity appears, an orthographic projection in which the cavity is surrounded by the resin foam particle (i.e., an orthographic projection in which the cavity forms an isolated cavity in the resin foam particle) is obtained.

In the resin particle, a proportion of a region A surrounded by a straight line circumscribing the recess at two or more points and the outer surface of the resin particle relative to a region occupied by the resin particle in an orthographic projection in which the recess can be confirmed (region A/region occupied by resin foam particle) is preferably 10% or more, and more preferably 30% or more. In particular, it is preferable that any of the ranges set forth above is satisfied in an orthographic projection including a deepest part of the recess. The deepest part of the recess may be a part for which the distance to an intersection point with the outer surface of the recess along a perpendicular line to a straight line circumscribing the recess at two or more points is longest.

In a case in which the recessed external part is a through hole, in an orthographic projection of the resin foam particle in which the through hole can be confirmed, the area of the through hole relative to the total area of the orthographic projection of the resin particle is preferably 10% or more, and more preferably 30% or more. In particular, any of the ranges set forth above is preferably satisfied in an orthographic projection of the resin particle in which the area of the through hole is largest. Moreover, in a cross-section in which the penetrating cavity shape of the through hole can be confirmed, the area of the cavity shape relative to the total area of the resin particle in the cross-section is preferably 10% or more, and more preferably 30% or more. The through hole preferably has at least one plane in which the area of the cavity shape satisfies the above, and more preferably satisfies any of the ranges set forth above in all cross-sections.

By selecting the shape of the resin particles such that the recessed external part satisfies the recess conditions and/or through hole conditions set forth above, connected pores (pores that are continuous, pores that are connected) can favorably be formed in a resin foam shaped product obtained after fusion and shaping.

Although the recessed external part of the resin particles may or may not be a through hole, it is particularly preferable that the resin particles have a shape including a recess.

Through a shape including a recess, a packing state that is not seen with conventional resin particles is obtained and an excellent balance of both sound absorption performance and mechanical strength can be realized through the structure of connected pores in a resin foam shaped product obtained after shaping.

A structure in which a groove shaped recess is provided in the resin foam particles is an example of a shape having a recess that is particularly advantageous. In production of a resin foam shaped product, resin foam particles having adjacent groove shaped recesses adopt a packing state in which they are engaged with one another during thermal fusion between resin foam particles and become joined. This leads to the formation of a high-strength resin foam shaped product in which the joining area between resin foam particles is large while also causing pores extending between resin foam particles (i.e., connected pores) to form in a case in which adjacent resin foam particles are joined in a form with the grooves thereof linked.

The groove shaped recess may be, for example, a shape (FIGS. 2A and 2B) resulting from stacking cross-sections (FIG. 1) of a shape obtained by cutting out part of an approximate circle that is hollow (for example, a C shape or a U shape) or a shape resulting from stacking cross-sections (FIG. 1) obtained by cutting out part of an approximate polygon that is hollow (for example, a triangle or a quadrilateral). The hollow of the approximate circle or the hollow of the approximate polygon may be an approximate circle or an approximate polygon, but is preferably the same shape as the shape surrounding the hollow. Moreover, it is preferable to adopt a shape such as that of concentric circles in which the center of the shape of the hollow and the center of the shape surrounding the hollow overlap.

Figure 2A:
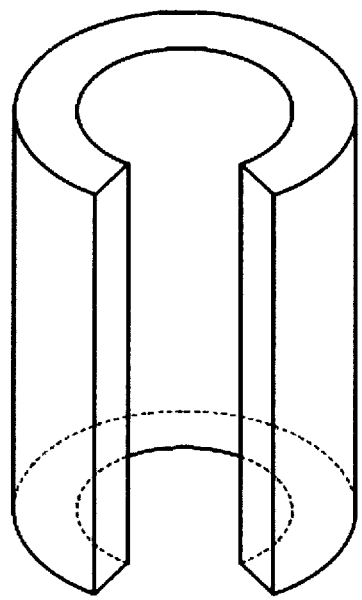
FIGS. 2A and 2B are perspective views of resin foam particles used in a laminate of a present embodiment.
Figure 2B:
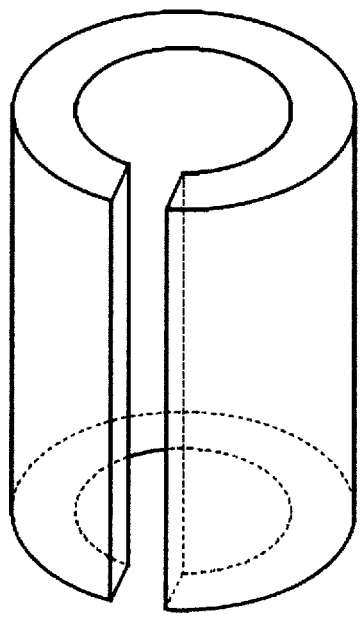

Examples of the recess include, for example, a saddle-like shape resulting from bending of a circular disc shape of certain thickness, a shape formed by bending or folding a circular disc in an out of plane direction, or a structure obtained by providing one or more recesses in a circular tube-like outer surface. An example of a particle shape that is particularly preferable in terms of ease of production, excellent productivity, and ease of shape control is a shape obtained by cutting out, from a circular column, a circular column having a smaller external diameter but the same axis and height to obtain a circular tube, and then cutting out a portion of the circular tube within a certain angle as viewed in the axial direction (FIGS. 2A and 2B). This shape is referred to below as a C-type cross-section partial-circle tube shape. Note that shapes that are substantially the same but with slight modifications can form similar pores in a resin foam shaped product and may be used within the scope of the present disclosure so long as the conditions described above are satisfied. FIGS. 2A and 2B illustrate preferable examples of the C-type cross-section partial-circle tube shape that differ in terms of size of the cut out portion.

The recess preferably has the same shape when cross-sections are formed successively relative to a specific direction of the resin foam particle. For example, as illustrated in FIGS. 2A and 2B, the shape of the recess in a cross-section relative to one direction of the resin foam particle (up/down direction in FIGS. 2A and 2B, extrusion direction) is preferably the same as the shape of the recess in a different cross-section formed upon shifting in the one direction.

The presence of a recessed external part in a resin particle can be confirmed by observing a transmission image of the resin particle under an optical microscope while changing the observation direction of the particle, and then making a judgement.

In the resin foam particles, a ratio $\rho_0/\rho_1$ of the density $\rho_0$ of a resin contained in the resin foam particles and the true density $\rho_1$ of the resin foam particles is preferably 2 to 20, more preferably 2.2 to 18, and still more preferably 2.5 to 15. A $\rho_0/\rho_1$ ratio of 2 or more is desirable because sound absorption performance is fully expressed, whereas a $\rho_0/\rho_1$ ratio of 20 or less is desirable because mechanical strength increases.

In the resin foam particles, a ratio $\rho_1/\rho_2$ of the true density $\rho_1$ of the resin foam particles and the bulk density $\rho_2$ of the resin foam particles is preferably 1.5 to 4.0, more preferably 1.8 to 3.5, and still more preferably 2 to 3. A $\rho_1/\rho_2$ ratio of 1.5 or more is desirable because sound absorption performance is fully expressed, whereas a $\rho_1/\rho_2$ ratio of 4.0 or less is desirable because mechanical strength increases.

In the present specification, the bulk density $\rho_2$ is a value $M/V_2$ obtained by dividing a given weight M of the resin foam particles by the bulk volume $V_2$ of the resin foam particles having that weight M, and the true density $\rho_1$ is a value $M/V_1$ obtained by dividing a given weight M of the resin foam particles by the true volume $V_1$ of the resin foam particles having that weight M. The bulk volume $V_2$ is a value read from the scale of a graduated cylinder when the given weight M of the resin foam particles is loaded into the cylinder and then the graduated cylinder is vibrated until the volume of the resin foam particles becomes constant. The true volume $V_1$ is the increase in volume of liquid that occurs when the given weight M of the resin foam particles is submerged in a graduated cylinder holding a liquid in which the resin foam particles do not dissolve.

The density $\rho_0$ of the resin is the density of the raw material resin prior to foaming and is the density measured by water submersion using a gravimeter.

In the present specification, $\rho_0$, $\rho_1$, and $\rho_2$ all refer to values obtained through measurement in an environment of 20° C. and 0.10 MPa.

The average particle diameter of the resin foam particles can be measured by measuring 100 g of the resin foam particles by a classification method using standard sieves prescribed by JIS Z8801. The average particle diameter of the resin foam particles is preferably 1.0 mm to 4.0 mm, and more preferably 1.2 mm to 3.0 mm. When the average particle diameter is 1.0 mm or more, handling during production becomes easy; when the average particle diameter is 4.0 mm or less, surface precision of a complicated shaped article is improved.

Note that the shape of the resin foam particles used in the present embodiment is not particularly limited and may be various shapes.

The method by which the resin foam particles are produced may be any method that can impart the desired external shape on particles such as a method using thermoplasticity of a thermoplastic resin or a method involving post-processing such as machining of particles in a solid state. Of such methods, profile extrusion using a die provided with a discharge cross-section having a particular shape can suitably be used as a method of producing particles of a consistent shape with excellent productivity. Production can be carried out by adopting any conventional and commonly known method such as a method in which a thermoplastic resin is melt extruded from an extruder including a die provided with a discharge cross-section of a particular shape, pelletization is performed by a method typically used in industry such as strand cutting or underwater cutting, and then the resultant pellets are foamed to obtain the resin foam particles, a method in which a blowing agent is injected partway along a barrel of an extruder, foaming is performed simultaneously with discharging, and then underwater cutting or strand cutting is performed after cooling to directly obtain the resin foam particles, or a method in which the resin is melted in an extruder, is extruded from a die having a desired cross-sectional shape, and is cut to a specific length by a pelletizer after being cooled to produce base material resin pellets that are subsequently impregnated with a blowing agent and are foamed with a certain expansion ratio through heating.

A cell modifier may be added in a case in which it is necessary to adjust the average cell diameter of the resin foam particles. Examples of the cell modifier include inorganic nucleating agents such as talc, silica, calcium silicate, calcium carbonate, aluminum oxide, titanium oxide, diatomaceous earth, clay, sodium bicarbonate, alumina, barium sulfate, aluminum oxide, and bentonite. Normally, the amount of cell modifier that is used and added may be 0.005 parts by mass to 2 parts by mass relative to the total amount of raw material of the resin foam particles.

The blowing agent used in production of the resin foam particles may, for example, be a volatile blowing agent. Examples of the volatile blowing agent include chain or cyclic lower aliphatic hydrocarbons such as methane, ethane, propane, butane, isobutane, pentane, isopentane, neopentane, hexane, heptane, cyclopentane, cyclohexane, and methylcyclopentane; halogenated hydrocarbons such as dicyclodifluoromethane, trichloromonofluoromethane, 1-chloro-1,1-difluoroethane, and 1-chloro-2,2,2-trifluoroethane; and blowing agents based on inorganic gases such as nitrogen, air, and carbon dioxide.

The foamed resin layer used in the present embodiment is a resin foam shaped product obtained by fusing together the above-described resin particles. In other words, the foamed resin inner layer is a shaped product including at least a section where at least two of the above-described resin foam particles are fused to one another. Fused sections and pores are present between resin foam particles that have fused.

The resin foam shaped product of the foamed resin layer includes pores that are continuous between the above-described resin foam particles that have fused. The porosity is preferably 15% to 80%, more preferably 18% to 70%, and still more preferably 20% to 60%.

The porosity can be measured by a method subsequently described in the EXAMPLES section.

The proportion constituted by the resin foam particles among the whole resin foam shaped product in the resin foam shaped product is preferably 98 mass % or more since this enables the performance of the resin foam particles having a recessed external part to be substantially obtained. The resin foam shaped product is a shaped product obtained through fusion of an assembly of the resin foam particles to one another and is required to have pores that are continuous between resin foam particles. The phrase "pores that are continuous" as used in the present specification means that as a result of pores being formed that are continuous between resin foam particles that are fused to one another, pores that are continuous between two opposing faces (between two surfaces) of the resin foam shaped product arise such that a state in which a fluid can flow is obtained.

The resin foam shaped product preferably has a thermal conductivity of 0.025 W/m·K to 0.080 W/m·K, more preferably 0.027 W/m·K to 0.075 W/m·K, and still more preferably 0.030 W/m·K to 0.070 W/m·K. When the thermal conductivity of the resin foam shaped product is 0.025 W/m·K or more, the porosity becomes appropriate, and the strength of the foam is adequate; when the thermal conductivity is 0.080 W/m·K or less, the heat insulation performance is increased, and thermal energy loss can be suppressed.

The thermal conductivity can be measured by a method subsequently described in the EXAMPLES section.

The fusion strength of the resin foam shaped product is evaluated from the elongation at break (%) of the resin foam shaped product by measuring the tensile strength based on JIS K6767A. The elongation at break is preferably 1% or more, and more preferably 2% or more. If the elongation at break is less than 1%, the resin foam shaped product may be damaged by vibration during running or vibration of a power system when it is installed in an engine room.

The resin foam shaped product can be produced by loading the resin foam particles into a closed mold and performing foaming, and may be produced by loading the resin foam particles into a mold that cannot be tightly sealed and heating the resin foam particles to fuse the resin foam particles to one another. Depending on the type of resin and the shaping conditions, a general-purpose in-mold foaming automated shaping machine may be used.

The desired balance of sound absorption performance and mechanical strength can be adjusted by producing the resin foam shaped product using a mixture of, in any ratio, unfoamed resin particles or resin foam particles having a recessed external part and particles of a typical shape that are resin foam particles of a spheroidal shape, a circular columnal shape, a polygonal columnal shape, or the like that do not have a recessed external part.

Although the resin foam shaped product of the present embodiment displays a high sound absorption coefficient by itself, it is preferable to laminate a surface material formed of fiber assemblies or a sponge-based foam such as a urethane foam or a melamine foam on the resin foam shaped product.

(Amount of Air Permeability of Laminated Structure)

The laminated structure of the present embodiment has an amount of air permeability in a certain range while having an air-impermeable outer layer. Although the air-impermeable outer layer has no air permeability, there is a certain amount of air permeability inside the foamed resin layer because the foamed resin layer includes continuous pores. As a result, a laminated structure with good sound absorption and sound insulation can be obtained. The amount of air permeability is affected by the porosity of continuous pores and the size of pores in the foam, and the sound absorption performance and the sound insulation performance affect both the porosity and the size of pores. Especially when the thickness is thin, the effect becomes remarkable.

The amount of air permeability is measured by cutting out a part of 41.5 mmϕ of the laminated structure as a sample, and installing the sample in a Frazier type testing machine so that the foamed resin layer side is on a sending side. The measurement result should be in a range of 2.5 cm$^3$/(cm$^2$·s) to 40 cm$^3$/(cm$^2$·s). The Frazier type testing machine is a testing machine conforming to the B method of ISO 7231: 2010. Regarding the pressure difference, the amount of air permeability at 125 Pa is determined also based on the B method of ISO 7231: 2010. Note that a clamp size, which is the area to be measured, is 5 cm$^3$. The sample to be measured is preferably small so that the cut surface is close to a flat surface because some laminated structures are distorted, although there is no problem in a case of a flat plate. Therefore, the size of the sample is 41.5 mmϕ, where the area to be measured can be properly covered even if the sample is slightly displaced from the clamp of the area to be measured. If there is a gap between the clamp plate and the sample due to distortion of the sample, a caulking material such as clay, gel substance, or silicone is used in the gap excluding the area to be measured to fill the gap between the clamp plate and the sample to increase the air tightness, and then the measurement is performed.

The amount of air permeability is preferably in a range of 3 cm$^3$/(cm$^2$·s) to 40 cm$^3$/(cm$^2$·s), and more preferably in a range of 5 cm$^3$/(cm$^2$·s) to 35 cm$^3$/(cm$^2$·s).

The amount of air permeability of the present embodiment is affected by not only the shape of resin foam beads but also the shaping conditions. If the expansion of the resin foam beads in a mold is large during shaping, the shape of foam beads collapses and the amount of air permeability significantly decreases, which is unfavorable. On the other hand, if the expansion is small, the fusion between the beads is weak and the strength of the foam is lowered, which is unfavorable. The expansion coefficient of the resin foam beads is preferably 1.05 times to 2 times. The expansion coefficient in the mold can be determined as a ratio of a volume measured with a pycnometer after heating the beads at the same temperature as the shaping temperature and then allowing it to cool to 25° C. relative to a volume of pores between beads and resin foam beads before shaping measured with a pycnometer at a measurement temperature of 25° C. On the other hand, the fusion between beads is probably inadequate at the above-mentioned expansion coefficient. Therefore, it is preferable to slightly open the mold just before the shaping, load the beads, and close the mold with a crack. Providing a crack can provide communication with an appropriate amount of air permeability while achieving adequate fusion.

The size of the sample cut out from the laminated structure of the present embodiment is 41.5 mmφ. The circle area to be measured on the sample side for the measurement of amount of air permeability is 5 cm$^2$, that is, the diameter is 25.2 mm. The sample should be larger than 5 cm$^2$. However, if it is too large, the measured value of the amount of air permeability decreases due to pressure loss of the continuous pores of the foam, and errors and variation increase, which is unfavorable.

Various methods can be used as the method of cutting out a sample of 41.5 mmφ from the laminated structure of the present embodiment. However, if the sample is cut out by welding with heat, the cut-out opening on the side surface of the foam melts and collapses. As a result, a correct amount of air permeability cannot be measured. It is preferably a method of cutting the sample out with a sharp cutter or a blade with as little heat applied to the blade as possible. If welding occurs, the welded part should be scraped with a file or the like. Moreover, since chips and the like may enter the opening after cutting, it is necessary to remove the chips with air or the like after cutting.

When the sample is greatly distorted, it is preferable to slightly heat the sample to correct the distortion of the sample. At this time, it is preferable to correct the distortion of the sample within a temperature at which the shape of the sample can be corrected below the melting point of the sample. If the sample is still distorted, there will be a gap between the sample and a sample stand, and a correct measured value cannot be obtained. In this case, clay or rubber may be provided between the sample stand and the sample to fill the gap between the sample stand and the sample, and then a correct measurement can be performed.

(Laminated Structure)

A laminated structure of the present embodiment is laminated, from the outside, in the order of an air-impermeable resin outer layer, and then a foamed resin layer that is an inner layer containing foamed resin with continuous pores containing fused resin foam particles. The laminated structure may be obtained by separately preparing the air-impermeable outer layer and the foamed resin layer and then joining them together. The joining method may be various methods such as being joined with an adhesive, vibration welding, hot plate welding, and ultrasonic welding. During the joining, if the foam is deformed, the amount of air permeability of the laminated structure decreases, which is unfavorable.

If possible, it is preferably a method of welding only the interface between the air-impermeable outer layer and the foamed resin layer to join the two layers.

The laminated structure may have a simple shape such as a tubular shape, where the tube may be straight or bent. Moreover, it may be in one direction or branched. In a case of a through hollow structure, a hole may be provided in the middle of the structure for joining a Helmholtz rosonator component that removes noise generated on the low frequency side or for providing a filter in the hollow part. The cross-section shape of the tubular shape is not limited to a circle, and it may have a hollow part of an ellipse, a rectangular parallelepiped, or a star shape. The dimensions of the structure are not particularly specified, where the hollow part may be a mixture of a thin part and a thick part, and the shape of the structure that has different cross-sectional shapes may change continuously or discontinuously. When a gas such as air is passed through the hollow part, the inner diameter preferably changes as continuously as possible because a discontinuous change in inner diameter causes too much change in the flow of gas.

The method of producing the laminated structure of the present embodiment is not particularly limited. It may be produced by preparing a tubular shaped body formed of a foamed resin (2), inserting a shaped body formed of an unfoamed resin (1), which has been shaped in advance, on the outside of the tubular shaped body, and welding the space therebetween by an adhesive, vibration welding, ultrasonic welding or the like. Moreover, in a case of a complicated hollow structure, the hollow laminated structure may be produced by preparing a shaped body formed of a resin (2) and a shaped body formed of an unfoamed resin (2) that correspond to half of the hollow structure, welding these shaped bodies in the same manner as described above, and then sticking the laminated shaped bodies of each half together with glue. It may also be produced by diving the laminated structure into a plurality of parts rather than two half parts, preparing each part separately, and integrating all parts into one laminated structure. It is preferable to produce the laminated structure having a through hollow structure by preparing half parts and then welding the half parts by vibration welding, hot plate welding, ultrasonic welding, or the like, where the half part is prepared by preparing a shaped body formed of an unfoamed resin through injection molding or the like, attaching the shaped body to a mold for foam shaping, and shaping a shaped body formed of a resin (2) through foam shaping to integrate an air-impermeable resin outer layer and a resin inner layer.

It is preferable that the outer layer and the inner layer of the laminated structure of the present embodiment are partially adhered to each other. Moreover, it is preferable that the outer layer and the inner layer are adhered to each other such that the interface therebetween partially includes pores, because the laminated structure exhibits excellent performance in terms of sound absorption and heat insulation in this case.

In the present embodiment, the air-impermeable outer layers and/or the foamed resin layers may have a welded portion, and the air-impermeable outer layers and the foamed resin layers may have a welded portion.

The laminated structure of the present embodiment can be suitably used for components for reducing various types of noise in which a gaseous fluid such as air flows, including, for example, a ventilation component for intake that sends air to an engine of an automobile or the like, and a ventilation component for exhaust such as ventilation components for exhaust pipes, indoors, and air conditioning in cars. Moreover, the laminated structure of the present embodiment can be suitably used for covers for automotive power or automotive electronics.

The laminated structure of the present embodiment may be a laminate of an air-impermeable outer layer and a foamed resin layer. However, when it is used for the exterior of an automobile, the air-impermeable outer layer is preferably used as the exterior of the automobile.

EXAMPLES

The following describes embodiments of the present disclosure through examples. However, the scope of the present disclosure is not in any way limited by these examples.

Evaluation methods used in the examples and comparative examples were as follows.

(1) Measurement of Surface Tension of Resin

A 10 cm×10 cm×2 mm flat plate sheet was prepared by heating and pressing all resin materials used as raw materials of resin particles at 280° C. for 5 minutes with a press of 10 t. Using this flat plate sheet, a test mixture solution was applied to a surface of 10 cm×10 cm, hand coating was performed using a No. 2 wire bar, and measurement was performed according to a method in which the temperature in the method described in JIS K6768 "Plastics-Film and Sheeting-Determination of Wetting Tension" had been changed to 20° C.

(2) Density $\rho_0$ (g/Cm$^3$) of Resin

The mass W (g) of pre-foaming resin was measured and then the volume V (cm$^3$) of the resin was measured by water submersion. The density of the resin was taken to be W/V (g/cm$^3$).

(3) True Density $\rho_1$ (g/Cm$^3$) of Resin Foam Particles

The mass W (g) of resin foam particles was measured and then the volume V (cm$^3$) of the resin foam particles was measured by water submersion. The true density of the resin foam particles was taken to be W/V (g/cm$^3$).

The density of resin raw material pellets after preliminary foaming was measured using a gravimeter.

(4) Bulk Density $\rho_2$ (g/Cm$^3$) of Resin Foam Particles

The bulk density of resin foam particles was calculated from the following formula by loading 100 g of resin foam particles into a graduated cylinder, vibrating the graduated cylinder until the volume of the resin foam particles was constant, flattening the upper surface of the resin foam particles, and then measuring the bulk volume $V_1$ (cm$^3$) as a value read from a marking corresponding to the upper surface, the mass $W_1$ (g) of the graduated cylinder with the resin foam particles loaded therein, and the mass $W_0$ (g) of the graduated cylinder.

$$\rho_2 = [W_1 - W_0]/V_1$$

(5) Average Expansion Coefficient of Foam Particles

For the resin foam particles (A-2) to (A-5), which were used in the laminated structures (D-1) to (D-17), gas was dissolved in the resin foam particles before shaping and the resin foamed particles were heated at a shaping temperature of 150° C. for 2 minutes to further foam the resin foamed particles, as in the production examples. The foam particles in which air or carbon dioxide gas had been further dissolved in an autoclave were further foamed at 150° C. The further foamed resin foam particles were cooled to room temperature and measured in the same manner as in (4) to determine the bulk volume, and the ratio was taken to be an average expansion coefficient.

(6) Average Particle Diameter D (Mm) of Resin Foam Particles

Standard sieves prescribed by JIS Z8801 that had nominal sizes of $d_1$=5.6 mm, $d_2$=4.75 mm, $d_3$=4 mm, $d_4$=3.35 mm, $d_5$=2.36 mm, $d_6$=1.7 mm, $d_7$=1.4 mm, and $d_8$=1 mm were used to classify 100 g of resin foam particles. The average particle diameter D of the whole assembly of particles was calculated from the following formula by taking the weight proportion of particles passing through a sieve $d_i$ but stopping at a sieve $d_{i+1}$ to be $X_i$.

$$D = \Sigma X_i (d_i d_{i+1})^{1/2}$$

(i represents an integer of 1 to 7.)

(7) Porosity (%) of Air-Permeable Resin Inner Layer

An air-permeable foamed resin part of 2 cm×2 cm×8 mm (thickness) was cut out from the obtained composite structure with a cutter, and the porosity of the air-permeable foamed resin part was determined by the following formula.

Porosity (%) of air-permeable foamed resin part=
[(B−C)/B]×100

In the above formula, B is the apparent volume (cm$^3$) of the resin foam, and C is the true volume (cm$^3$) of the resin foam. The apparent volume is the volume calculated from external dimensions of the shaped product, whereas the true volume C is the actual volume of the shaped product excluding pores. The true volume C is obtained by measuring the increase in volume when the resin foam shaped product is submerged in a liquid (for example, alcohol).

(8) Measurement of Amount of Air Permeability

The amount of air permeability from a side surface of a sample was measured based on ISO7231 using a Frazier permeameter produced by Toyo Seiki Seisaku-sho, Ltd. The measurement was performed by selecting an area to be measured of 5 cm$^2$ where a hole diameter of a clamp plate was 25.2 mm. A sample was slowly cut with a circular cutter, which had a circular shape with a diameter of 41.5 mm, from the air-impermeable layer side to prepare a substantially columnar sample. In a case of a bent sample, the sample was heated at 80° C. and applied with a stress to correct the bending so as to obtain a flat plate. The sample took the clamp plate side as the foamed resin layer, and clay was provided between a sample stand and the foamed resin layer without blocking the hole of the clamp plate to be measured so that air would not leak from between the clamp plate and the foamed resin. The sample was fixed with a clamp ring from above, and the Frazier permeameter was operated to determine the amount of air permeability when a differential pressure was 125 kPa.

(9) Judgement of Air Permeability of Outer Layer

An outer layer part of the shaped product was cut out at a size of 2 cm×2 cm×shaped product thickness, and the air permeability of the outer layer was judged as follows based on measurement of unit length flow resistance.

The unit length flow resistance value was measured using the AC method of International Standard ISO 9053 using a flow resistance measurement system AirReSys produced by Nihon Onkyo Engineering Co., Ltd. Specifically, the sample cut out in (5) of 8 mm in thickness was used to measure differential pressure P (Pa) between the front and rear surfaces of the material in a state with a uniform flow at a flow rate F of 0.5 mm/s, and then the unit length flow resistance was determined from the differential pressure and the material thickness t (m) as P/(t·F) (N·s/m$^4$). A case in which the unit length flow resistance value exceeded 200,000 N·s/m$^4$ was evaluated as a case in which the outer layer had no air permeability.

(10) Interface Between Outer Layer and Inner Layer

The obtained composite structure was cut in the vertical direction, and an interface between the outer layer and the inner layer was visually observed to confirm whether it had been completely welded or partially welded.

(11) Measurement of Sound Absorption Coefficient of Laminated Structure

For the approximately cylindrical sample with a diameter of 41.5 mm prepared in (8) of the laminated structures (D-1) to (D-17), the sound absorption coefficient at normal incidence was measured based on JIS A1405-2. A rigid body made of aluminum was directly set on the air-impermeable outer layer surface, which was the back side of the sample, with the sound source on the foamed layer side, and the sound absorption coefficient at normal incidence was measured at 20° C. for frequencies of 160 Hz to 5,000 Hz using a normal incidence sound absorption coefficient measurement system WinZacMTX produced by Nihon Onkyo Engineering Co., Ltd. The frequency at which the sound absorption coefficient was maximum and the sound absorption coefficient were obtained.

(12) Measurement of sound insulation of laminated structure

The sound insulation of the laminated structures (D-1) to (D-17) was evaluated by determining the transmission loss of 1000 Hz of the approximately cylindrical sample with a diameter of 41.5 mm prepared in (8) using a normal incidence sound insulation coefficient measurement system WinZacMTX produced by Nihon Onkyo Engineering Co., Ltd. The attenuation of sound passing through the sample was measured by placing a sound source on the foamed layer side and a microphone on the air-impermeable outer layer surface side.

(13) Measurement of Noise Attenuation of Laminated Structure

Figure 4:
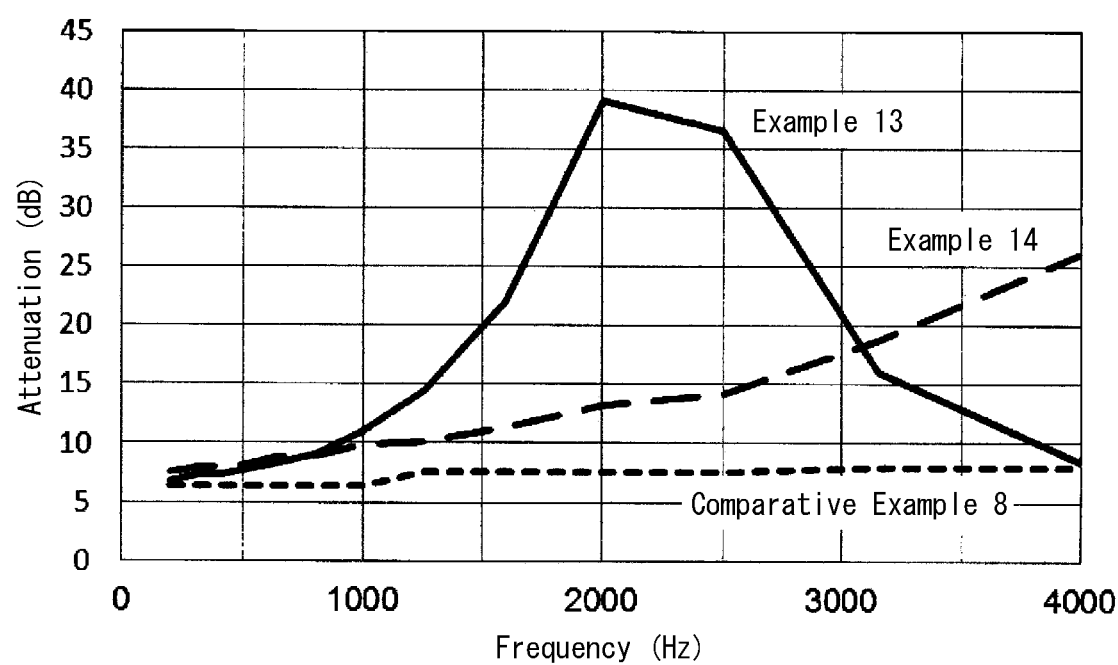
FIG. 4 illustrates a relationship between frequency and noise attenuation of laminated structures having a through hollow structure of Examples and Comparative Examples of a present embodiment.
Figure 5:
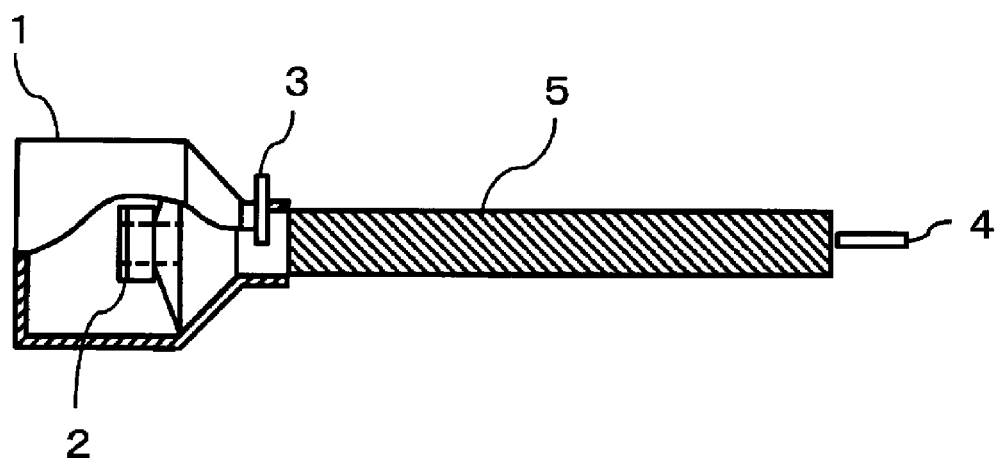
FIG. 5 is a partial perspective schematic view of an apparatus for measuring noise attenuation characteristics of a laminated structure having a hollow structure of a present embodiment.

FIG. 5 is a partial perspective schematic view of an apparatus for measuring noise attenuation characteristics of the laminated structures (D-18) to (D-27). The apparatus includes a speaker 2 and an enclosure 1, where a structure 5, which is an object to be measured, is attached to the enclosure 1, and a sound pressure on the intake port side is measured by a microphone 3 and a sound pressure on the discharge port side is measured by a microphone 4. Noise attenuation characteristics are represented by a sound pressure ratio for each frequency band at the sound pressure level obtained by analyzing the sound pressure of the microphone 3 and the sound pressure of the microphone 4 respectively by one-third octave. FIG. 4 illustrates the evaluation results of noise attenuation characteristics of Examples and Comparative Examples. In the graph of FIG. 4, the vertical axis represents, as the noise attenuation characteristics, the sound pressure ratio (dB) between the microphone 3 and the microphone 4. It can be understood from this graph that the larger the value of noise attenuation is, that is, the larger the sound pressure ratio is, the more the noise is attenuated.

(14) Measurement of Sound Insulation of Laminated Structure

Figure 6:
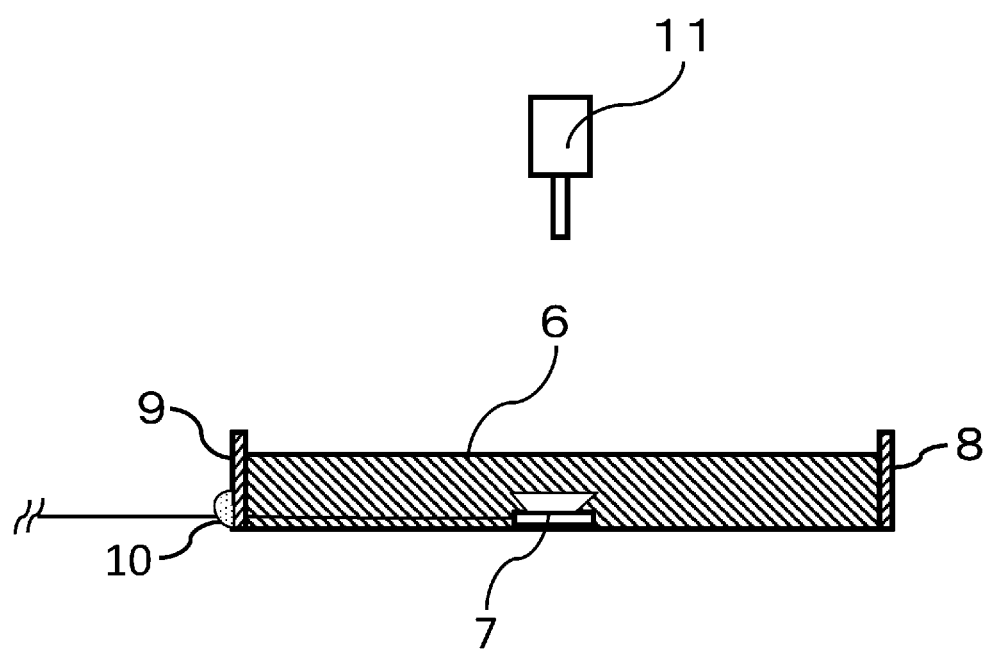
FIG. 6 is a partial perspective schematic view of an apparatus for measuring sound insulation of a laminated structure having a hollow structure of a present embodiment.

FIG. 6 is a partial perspective schematic view of an apparatus for measuring sound insulation of the laminated structures (D-18) to (D-27). A speaker 7 is installed in the center of a laminated structure 6, and both ends of the hollow structure are covered with iron plates 8 and 9. A sealing material 10 is attached around a wiring portion of the speaker to eliminate an open portion of the hollow structure of the laminated structure 6 and prevent sound from leaking from the open portion. A sound level meter 11 (NL-42 produced by RION Co., Ltd.) was installed at a distance of 30 cm from the top of a sample, and a volume of 50 dB was sounded from the speaker without the sample to evaluate the volume output through the sample.

(15) Evaluation of Heat Insulation

A band heater was attached to an air-impermeable outer layer surface of a laminated structure obtained in an environment of 25° C., and a thermocouple was installed on the middle outer surface of the composite. Then, a thermocouple was installed on the inner surface on a through side of the composite structure so as to be paired with the installed thermocouple. The output of the band heater was controlled so that the temperature of the surface of the composite was always kept at 100° C. by the band heater, and the temperature of the thermocouple on the inner surface on the through side was measured after 20 minutes. It was judged as having heat insulation when the temperature was lower than 60° C.

(16) Evaluation of Durability of Flat Plate

A laminated composite flat plate of the composite structures (D-1) to (D-17) was bent to an internal angle of 150°. At that time, the presence of fissures or cracks in the sample and peeling at the laminated interface was evaluated. It was evaluated as good when there was no fissure, crack, or peeling and evaluated as poor when there were fissures, cracks, or peeling.

(17) Evaluation of Durability by Blowing Air

Air at 60° C. was continuously blown for 1,000 hours at 7 m$^3$/sec to the through hollow structure portion of the obtained composite structures (D-18) to (D-27). The appearance (shaving, cutting) of the inner surface of the hollow structure was visually observed after blowing, and it was evaluated as good when there was no change in appearance from before blowing and evaluated as poor when the appearance was scraped, cut or torn.

Production Examples 1 and 2 of Resin Particles (A-1 and A-2)

Figure 3:
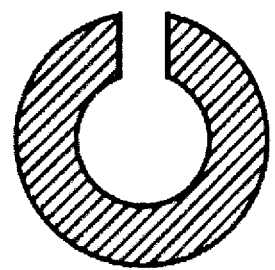
FIG. 3 illustrates cross-sectional views of a discharge outlet shape of profile extrusion dies used in Examples 1 to 6 and a recessed external part of resin foam particles obtained therewith.
Figure 3:
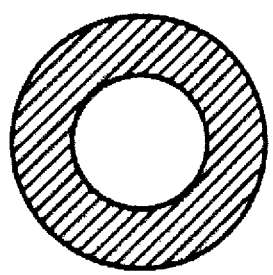
Figure 3:
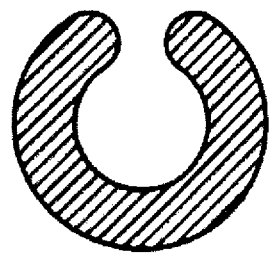
Figure 3:
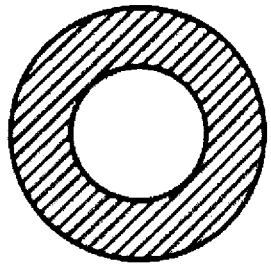

Polyamide 6 resin (UBE Nylon "1022B" produced by Ube Industries, Ltd.; surface tension at 20° C.: 46 mN/m) was melted using an extruder and was discharged as a strand from a profile extrusion die having a cross-section shape (a1) illustrated in FIG. 3. The strand was pelletized by a pelletizer to obtain pellets having an average particle diameter of 1.4 mm, which were resin particles A-1. The obtained resin particles (A-1) were loaded into a 10° C. autoclave, 4 MPa carbon dioxide gas was blown into the autoclave, and absorption of the carbon dioxide gas was carried out for 3 hours. Next, mini-pellets impregnated with carbon dioxide gas were transferred to a foaming apparatus, 240° C. air was blown into the foaming apparatus for 20 seconds, and an assembly of polyamide resin foam particles, which were resin foam particles A-2, was obtained. The average particle diameter of the polyamide resin foam particles A-2 contained in the obtained assembly of polyamide resin foam particles was 2.0 mm. When a polyamide resin foam particle A-2 was cut and observed, numerous closed cells had been formed uniformly across the cut surface in the polyamide resin foam particle. A cross-section of the resin foam particles A-2 had a recessed external part with a shape (a2) illustrated in FIG. 3. Table 1 lists the measurement results of the resin foam particles.

Production Example 3 of Resin Particles (A-3)

An extruder was used to perform heated melt kneading of 60 mass % of polyphenylene ether-based resin (product name: Xyron TYPE S201A; produced by Asahi Kasei Corporation; surface tension at 20° C.: 40 mN/m), 18 mass % of a non-halogen flame retardant (bisphenol A-bis(diphenylphosphate) (BBP)), 10 mass % of high impact polystyrene resin (HIPS) having a rubber concentration of 6 mass % (rubber component content of 0.6 mass % in base material resin), and 12 mass % of general-purpose polystyrene resin (PS) (product name: GP685; produced by PS Japan Corporation). A strand was discharged from a profile extrusion die as illustrated in FIG. 3 and was pelletized by a pelletizer to obtain pellets. In accordance with a method described in Example 1 of JP H4-372630 A, the above-described pellets were housed in a pressure-resistant vessel as a base material resin, gas inside the vessel was replaced with dry air, carbon dioxide (gas) was subsequently injected as a blowing agent, the pellets serving as the base material resin were impregnated with 7 mass % of carbon dioxide under conditions of a pressure of 3.2 MPa and a temperature of 11° C. over 3 hours, and then the base material resin pellets were foamed by pressurized steam in a foaming furnace while being stirred. The general forms of the obtained resin foam particles are illustrated in FIG. 3. The die discharge outlet in Production Example 3 had the cross-section shape (e1) illustrated in FIG. 3. Moreover, the resin foam particles in Production Example 3 had the cross-section (e2) illustrated in FIG. 3. Table 1 lists the measurement results of the resin foam particles.

Production Example 4 of Resin Particles (A-4)

A mixture of 100 parts by weight of a polycondensate of ethylene glycol, isophthalic acid, and terephthalic acid (isophthalic acid content: 2 mass %; surface tension at 20° C.: 43 mN/m), 0.3 parts by weight of pyromellitic dianhydride, and 0.03 parts by weight of sodium carbonate was melted and kneaded at 270° C. to 290° C. in an extruder. During this melting and kneading, butane was injected from partway along the barrel of the extruder as a blowing agent in a proportion of 1.0 mass % relative to the mixture. After the mixture had passed through a profile extrusion die having a shape (a1) illustrated in FIG. 3 and had undergone preliminary foaming, the mixture was cooled straight away in a cooling water tank and was cut into a small particle form by a pelletizer to produce resin foam particles. The obtained resin foam particles had a cross-section (a2) illustrated in FIG. 3.

The obtained resin foam particles had a bulk density of 0.14 g/cm$^3$ and an average particle diameter of 1.5 mm. Table 1 lists the measurement results of the resin foam particles.

Production Example 5 of Resin Particles (A-5)

A high melt tension (HMS) polypropylene resin (produced by Borealis; model name: "WB135"; surface tension at 20° C.: 30 mN/m) was used as the resin. The polypropylene resin was supplied to a tandem extruder of ϕ90 mm-ϕ150 mm for heated melt kneading. Melt kneading was performed in an extruder (ϕ90 mm) on the upstream side, and a blowing agent (isobutane/normal butane=70/30 (molar ratio)) was injected partway along the extruder. After the kneading, the polypropylene resin was further cooled to 165° C., which was a temperature suitable for extrusion, in an extruder ($ 150 mm) on the downstream side and was discharged into the atmosphere as a strand from a profile extrusion die having a shape (a1) illustrated in FIG. 3 mounted on the extruder to perform extrusion foaming. The strand was pelletized by a pelletizer to obtain pellets that were resin particles A-5. The obtained resin foam particles had a cross-section (a2) illustrated in FIG. 3. The obtained resin foam particles had a bulk density of 0.12 g/cm$^3$ and an average particle diameter of 1.7 mm. Table 1 lists the measurement results of the resin foam particles.

Production Example 6 of Resin Particles (B-1)

Resin foam particles and resin foam particles B-1 were obtained under the same conditions as in Production Example 1, with the exception that the profile extrusion die of the extruder was changed to a normal circular cross-section die without hollow part. Table 1 lists the measurement results of the resin foam particles.

TABLE 1

| | Type | Production Example 1 A-1 | Production Example 2 A-2 | Production Example 3 A-3 | Production Example 4 A-4 | Production Example 5 A-5 | Production Example 6 B-1 |
|---|---|---|---|---|---|---|---|
| Resin foam particles | Resin type | Polyamide resin | Polyamide resin | Modified polyphenylene ether resin | Copolymerized polyester-based resin | Polypropylene resin | Polyamide resin |
| | Cross-sectional shape | FIG. 3 (a1) | FIG. 3 (a2) | FIG. 3 (e2) | FIG. 3 (a2) | FIG. 3 (a2) | Substantially columnar shape without recessed external part |
| | $\rho_0$(g/cm$^3$) | 1.14 | 1.14 | 1.08 | 1.34 | 0.91 | 1.14 |
| | $\rho_1$(g/cm$^3$) | — | 0.30 | 0.25 | 0.28 | 0.24 | 0.30 |
| | $\rho_2$(g/cm$^3$) | — | 0.12 | 0.1 | 0.14 | 0.12 | 0.14 |
| | $\rho_0/\rho_1$ | — | 3.8 | 4.3 | 4.8 | 3.8 | 3.6 |
| | $\rho_1/\rho_2$ | — | 2.5 | 2.5 | 2.0 | 2.0 | 2.1 |
| | Average particle diameter (mm) | 1.1 | 2.0 | 2.0 | 2.0 | 1.7 | 2.2 |

Production Examples of Air-Impermeable Outer Layers (C-1 to C-4)

A shaped product of a flat plate having a length and a width of 300 mm and a thickness of 1 mm was shaped by injection molding using a polyamide 6 resin (UBE Nylon "1022B" produced by Ube Industries, Ltd). A mold whose cavity was in the shape of the shaped product was prepared, and shaping was performed with a side film gate. The shaping was performed using an injection molding machine (Toshiba EC-130S), under conditions of a barrel temperature of 250° C., a mold temperature of 100° C., an injection pressure of 40 MPa, an injection time of 2.5 seconds, a holding pressure of 80 MPa for 15 seconds, and a cooling time of 60 seconds, and gate cutting was performed to obtain an outer layer (C-1).

An extruder was used to perform heated melt kneading of 60 mass % of polyphenylene ether-based resin (product name: Xyron TYPE S201A; produced by Asahi Kasei Corporation; surface tension at 20° C.: 40 mN/m), 18 mass % of a non-halogen flame retardant (bisphenol A-bis(diphenylphosphate) (BBP)), 10 mass % of high impact polystyrene resin (HIPS) having a rubber concentration of 6 mass % (rubber component content of 0.6 mass % in base material resin), and 12 mass % of general-purpose polystyrene resin (PS) (product name: GP685; produced by PS Japan Corporation). A strand was discharged from a cylindrical extrusion die with a hole of 2 mm and was pelletized by a pelletizer to obtain pellets with a length of 2 mm. Shaping was performed using the same mold and injection molding machine as the outer layer (C-1) in the same manner at a barrel temperature of 240° C. and a mold temperature of 75° C. to obtain an outer layer (C-2).

Shaping was performed using pellets of a polycondensate of ethylene glycol, isophthalic acid, and terephthalic acid (isophthalic acid content: 2 mass %) and the same mold and injection molding machine as the outer layer (C-1) in the same manner at a barrel temperature of 280° C. and a mold temperature of 100° C. to obtain an outer layer (C-3).

Shaping was performed using a high melt tension (HMS) polypropylene resin (produced by Borealis; model name: "WB135" pellet) and the same mold and injection molding machine as the outer layer (C-1) in the same manner at a barrel temperature of 260° C. and a mold temperature of 80° C. to obtain an outer layer (C-4).

Production Example of Laminated Structure (D-1)

The obtained resin particles (A-2) were loaded into an autoclave again, and absorption of 0.7 MPa air was carried out for 22 hours at 10° C. When the autoclave was opened and the obtained particles were expanded at 150° C., the expansion coefficient of the particles was 1.5 times relative to the resin particles A-2 before absorption of air. The resin particles A-2 that had been impregnated with carbon dioxide gas were loaded into a flat plate-shaped mold for foam shaping where the mold cavity was in a concave shape of a length and a width of 30 cm and a thickness of 20 mm and the core was a insert in a convex shape, and the size of the piece of the core was adjusted so that the resin particles would not leak from the cavity even when a crack was provided as described below. Foam shaping was performed by inserting the outer layer (C-1) into the mold cavity on one side, filling the space of the cavity with a parting line of 1.9 mm left which was to be a crack when the mold was completely closed, completely closing the mold immediately after filling, and blowing steam at 150° C. for 30 seconds from the side of the cavity opposite to the inserting side. A shaped product in which the outer layer (C-1) and the foamed resin particles (A-2) had been fused was obtained. The thickness of the foamed resin layer was 19 mm.

When the resin foam shaped product was cut and observed, an assembly of polyamide resin foam particles having numerous closed cells with a cell diameter of 200 μm to 400 μm had been formed. The presence of continuous pores was confirmed from the measurement value for airflow resistance, and a laminated structure (D-1) having continuous pores was obtained. Table 2 lists the measurement results of the laminated structure.

Production Example of Laminated Structure (D-2)

Shaping was performed under the same conditions as for the laminated structure (D-1) with the exception that a flat plate-shaped mold for foam shaping with a mold cavity of a length and a width of 30 cm and a thickness of 10 mm was used and that a parting line of 0.9 mm was left immediately before the shaping which was to be a crack when the mold was completely closed. A laminated structure (D-2) was thus obtained. Table 2 lists the measurement results of the laminated structure.

Production Example of Laminated Structure (D-3)

Shaping was performed under the same conditions as for the laminated structure (D-1) with the exception that a flat plate-shaped mold for foam shaping with a mold cavity of a length and a width of 30 cm and a thickness of 39 mm was used and that a parting line of 7 mm was left immediately before the shaping which was to be a crack when the mold was completely closed. A laminated structure (D-3) was thus obtained. When the resin foam shaped product was cut and observed, an assembly of polyamide resin foam particles having numerous closed cells with a cell diameter of 200 μm to 400 μm had been formed. The presence of continuous pores was confirmed from the measurement value for airflow resistance, and a laminated structure (D-3) having continuous pores was obtained. Table 2 lists the measurement results of the laminated structure.

Production Example of Laminated Structure (D-4)

A laminated structure (D-4) was obtained by performing foam shaping and hot plate welding using the air-impermeable outer layer and resin particles listed in Table 2 with the mold for foam shaping used for the laminated structure (D-1). Particles obtained by loading the resin particles (B-1) into an autoclave again and carrying out absorption of 4 MPa carbon dioxide gas for 3 hours at 10° C., which were 70% by weight, and unfoamed resin particles (A-1) were used. The expansion coefficient of the 70% resin particles (B-1) that had been loaded into an autoclave again and the 30% resin particles (A-1) not loaded into an autoclave, which were particles used in the laminated structure (D-4), was determined by measuring the volume of a mixture of 70% (B-1) before being loaded into an autoclave and 30% resin particles (A-1) and the volume after expansion at 150° C. of a mixture of 70% resin particles (B-1) after being loaded into an autoclave and 30% resin particles (A-1) not loaded into an autoclave to obtain an average expansion coefficient from the ratio of the volumes.

When the resin foam shaped product was cut and observed, an assembly of particles including polyamide resin foam particles having numerous closed cells with a cell diameter of 200 μm to 400 μm had been formed. The presence of continuous pores was confirmed from the measurement value for airflow resistance, and a laminated structure (D-4) having continuous pores was obtained. Table 2 lists the measurement results of the laminated structure.

Production Examples of Laminated Structures (D-5) to (D-7)

A laminated structure (D-5) to (D-7) was obtained by performing foam shaping and hot plate welding using the air-impermeable outer layer and resin particles listed in Table 2 with the mold for foam shaping used for the laminated structure (D-1). Shaping was performed with a crack of 1.9 mm for all laminated structures. Particles in which absorption of 4 MPa carbon dioxide gas has been carried out for 3 hours at 10° C. were used, and the expansion coefficient after expansion at 150° C. is listed in Table 1.

When the resin foam shaped product was cut and observed, an assembly of resin foam particles having numerous closed cells with a cell diameter of 200 μm to 400 μm had been formed. The presence of continuous pores was confirmed from the measurement value for airflow resistance, and laminated structures (D-5) to (D-7) having continuous pores were obtained. Table 2 lists the measurement results of the laminated structures.

Production Example of Laminated Structure (D-8)

The obtained resin particles (A-2) were loaded into an autoclave again, and absorption of 0.5 MPa air was carried out for 22 hours at 10° C. When the autoclave was opened and the obtained particles were expanded at 230° C., the expansion coefficient of the particles was 1.3 times relative to the resin particles (A-2) before absorption of air. The resin particles (A-2) that had been impregnated with carbon dioxide gas were loaded into a flat plate-shaped mold for foam shaping with a mold cavity of a length and a width of 30 cm and a thickness of 10 mm. Foam shaping was performed by inserting the outer layer (C-1) into the mold cavity on one side, filling the space of the cavity with a parting line of 1.4 mm left which was to be a crack when the mold was completely closed, completely closing the mold immediately after filling, and blowing steam at 150° C. for 30 seconds from the side of the cavity opposite to the inserting side. A shaped product in which the outer layer (C-1) and the foamed resin particles (A-2) had been fused was obtained. The thickness of the foamed resin layer was 9 mm.

When the resin foam shaped product was cut and observed, an assembly of resin foam particles having numerous closed cells with a cell diameter of 200 μm to 400 μm had been formed. The presence of continuous pores was confirmed from the measurement value for airflow resistance, and a laminated structure (D-8) having continuous pores was obtained. Table 2 lists the measurement results of the laminated structure.

Production Examples of Laminated Structures (D-9) to (D-12)

Laminated structures (D-9) to (D-12) were obtained by performing foam shaping using the air-impermeable outer layer and resin particles listed in Table 2 with the mold for foam shaping used for the laminated structure (D-1), where particles obtained by loading the obtained resin particles (A-2) into an autoclave again and carrying out absorption of 0.7 MPa air for 22 hours at 10° C. were used, and the amount of crack was changed for each laminated structure. Table 2 lists the measurement results of the laminated structures.

Production Example of Laminated Structure (D-13)

Particles obtained by loading the obtained resin particles (A-2) into an autoclave again and carrying out absorption of 0.4 MPa air for 22 hours at 10° C. were used. The expansion coefficient of the resin particles was 1.2 times. Foam shaping was performed, with the flat plate-shaped mold for foam shaping having a thickness of 20 mm used for the laminated structure (D-1), by inserting the outer layer (C-1) into the mold cavity on one side, setting a crack of 0.5 mm, and blowing steam at 150° C. for 30 seconds from the side of the cavity opposite to the inserting side. A shaped product in which the outer layer (C-1) and the foamed resin particles (A-2) had been fused was obtained. The thickness of the foamed resin layer was 19 mm.

When the resin foam shaped product was cut and observed, an assembly of resin foam particles having numerous closed cells with a cell diameter of 200 μm to 400 μm had been formed. The presence of continuous pores was confirmed from the measurement value for airflow resistance, and a laminated structure (D-13) having continuous pores was obtained. Table 2 lists the measurement results of the laminated structure.

Production Example of Laminated Structure (D-14)

Particles obtained by loading the obtained resin particles (A-2) into an autoclave again and carrying out absorption of 0.9 MPa air for 22 hours at 40° C. were used. The expansion coefficient of the resin was 2.5 times. Foam shaping was performed, with the flat plate-shaped mold for foam shaping having a thickness of 20 mm used for the laminated structure (D-1), by inserting the outer layer (C-1) into the mold cavity on one side, setting a crack of 1.9 mm, and blowing steam at 150° C. for 30 seconds from the side of the cavity opposite to the inserting side. A shaped product in which the outer layer (C-1) and the foamed resin particles (A-2) had been fused was obtained. The thickness of the foamed resin layer was 19 mm.

When the resin foam shaped product was cut and observed, an assembly of resin foam particles having numerous closed cells with a cell diameter of 200 μm to 400 μm had been formed. The presence of continuous pores was confirmed from the measurement value for airflow resistance, and a laminated structure (D-14) having continuous pores was obtained. Table 2 lists the measurement results of the laminated structure.

Production Example of Laminated Structure (D-15)

Particles obtained by loading the obtained resin particles (A-5) into an autoclave again and carrying out absorption of 0.9 MPa air for 22 hours at 10° C. were used. The expansion coefficient of the resin was 1.4 times. Foam shaping was performed, with the flat plate-shaped mold for foam shaping having a thickness of 20 mm used for the laminated structure (D-1), by inserting the outer layer (C-4) into the mold cavity on one side, setting a crack of 0 mm, and blowing steam at 150° C. for 30 seconds from the side of the cavity opposite to the inserting side. A shaped product in which the outer layer (C-4) and the foamed resin particles (A-5) had been fused was obtained. The thickness of the foamed resin layer was 19 mm.

When the resin foam shaped product was cut and observed, an assembly of resin foam particles having numerous closed cells with a cell diameter of 200 μm to 400 μm had been formed. The presence of continuous pores was confirmed from the measurement value for airflow resistance, and a laminated structure (D-15) having continuous pores was obtained. Table 2 lists the measurement results of the laminated structure.

Production Example of Laminated Structure (D-16)

Particles obtained by loading the obtained resin particles (A-5) into an autoclave again and carrying out absorption of 0.9 MPa air for 22 hours at 40° C. were used. The expansion coefficient of the resin was 2.1 times. Foam shaping was performed, with the flat plate-shaped mold for foam shaping having a thickness of 20 mm used for the laminated structure (D-1), by inserting the outer layer (C-4) into the mold cavity on one side, setting a crack of 0 mm, and blowing steam at 150° C. for 30 seconds from the side of the cavity opposite to the inserting side. A shaped product in which the outer layer (C-5) and the foamed resin particles (A-5) had been fused was obtained. The thickness of the foamed resin layer was 19 mm.

When the resin foam shaped product was cut and observed, an assembly of resin foam particles having numerous closed cells with a cell diameter of 200 μm to 400 μm had been formed. The presence of continuous pores was confirmed from the measurement value for airflow resistance, and a laminated structure (D-15) having continuous pores was obtained. Table 2 lists the measurement results of the laminated structure.

Production Example of Laminated Structure (D-17)

Particles obtained by loading the obtained resin particles (B-1) into an autoclave again and carrying out absorption of 0.7 MPa air for 22 hours at 10° C. were used. The expansion coefficient of the resin was 1.5 times. Foam shaping was performed, with the flat plate-shaped mold for foam shaping having a thickness of 20 mm used for the laminated structure (D-1), by inserting the outer layer (C-1) into the mold cavity on one side, setting a crack of 0 mm, and blowing steam at 150° C. for 30 seconds from the side of the cavity opposite to the inserting side. A shaped product in which the outer layer (C-1) and the foamed resin particles (B-1) had been fused was obtained. The thickness of the foamed resin layer was 19 mm. When the resin foam shaped product was cut and observed, an assembly of resin foam particles having numerous closed cells with a cell diameter of 200 μm to 400 μm had been formed. The presence of continuous pores was not confirmed from the measurement value for amount of air permeability, and a laminated structure having no continuous pores was obtained. Table 2 lists the measurement results of the laminated structure.

TABLE 2

| | | | Example 1 | Example 2 | Example 3 | Example 4 | Example 5 | Example 6 | Example 7 | Example 8 | Example 9 |
|---|---|---|---|---|---|---|---|---|---|---|---|
| Laminate | Laminated structure | | D-1 | D-2 | D-3 | D-3 | D-4 | D-5 | D-6 | D-8 | D-9 |
| | Air-impermeable outer layer | Type of resin | C-1 | C-1 | C-1 | C-1 | C-2 | C-3 | C-4 | C-1 | C-1 |
| | | Outer layer thickness (mm) | 1 | 1 | 1 | 1 | 1 | 1 | 1 | 1 | 1 |
| | | Air-impermeable | Yes | Yes | Yes | Yes | Yes | Yes | Yes | Yes | Yes |
| | Foamed resin layer | Type of resin (ratio %) | A-2 (100) | A-2 (100) | A-2 (100) | B-1 (70) A-1 (30) | A-3 (100) | A-4 (100) | A-5 (100) | A-2 (100) | A-2 (100) |
| | | Thickness (mm) | 19 | 9 | 38 | 19 | 19 | 19 | 19 | 9 | 19 |
| | | Crack (mm) | 1.9 | 0.9 | 7.0 | 1.9 | 1.9 | 1.9 | 1.9 | 1.4 | 2.3 |
| | | Average coefficient of expansion of foamed resin | 1.5 | 1.5 | 1.5 | 1.5 | 1.8 | 1.8 | 1.8 | 1.3 | 1.5 |
| | | Continuous porosity (%) | 40.1 | 37.2 | 36.4 | 16.3 | 37.4 | 33.2 | 28.8 | 39.1 | 39.1 |
| | | Amount of air permeability ($cm^3/cm^2 \cdot s$) | 38.7 | 34.5 | 15.1 | 6.7 | 23.8 | 19.3 | 14.1 | 33.9 | 29.7 |
| | | Interface between outer layer and inner layer | Partially adhered | Partially adhered | Partially adhered | Partially adhered | Partially adhered | Partially adhered | Partially adhered | Partially adhered | Partially adhered |
| Evaluation | | Maximum sound absorption frequency (Hz) | 2500 | 4000 | 1500 | 2000 | 2500 | 2500 | 2500 | 2500 | 2500 |
| | | Maximum sound absorption (%) | 90 | 89 | 81 | 68 | 83 | 83 | 80 | 88 | 87 |
| | | 1000 Hz sound insulation (dB) | 12 | 12 | 15 | 18 | 15 | 15 | 16 | 12 | 13 |
| | | Heat insulation (Air-impermeable layer side surface temperature ° C.) | 46 | 47 | 35 | 47 | 38 | 36 | 36 | 44 | 41 |
| | | Durability (inside appearance evaluation) | Good | Good | Good | Good | Good | Good | Good | Good | Good |

| | | | Example 10 | Example 11 | Example 12 | Comparative Example 1 | Comparative Example 2 | Comparative Example 3 | Comparative Example 4 | Comparative Example 5 |
|---|---|---|---|---|---|---|---|---|---|---|
| Laminate | Laminated structure | | D-10 | D-11 | D-12 | D-13 | D-14 | D-15 | D-16 | D-17 |
| | Air-impermeable outer layer | Type of resin | C-1 | C-1 | C-1 | C-1 | C-1 | C-4 | C-4 | C-1 |
| | | Outer layer thickness (mm) | 1 | 1 | 1 | 1 | 1 | 1 | 1 | 1 |
| | | Air-impermeable | Yes | Yes | Yes | Yes | Yes | Yes | Yes | Yes |

TABLE 2-continued

| | | | | | | | | | |
|---|---|---|---|---|---|---|---|---|---|
| Foamed resin layer | Type of resin (ratio %) | A-2 (100) — | A-2 (100) — | A-2 (100) — | A-2 (100) — | A-2 (100) — | A-5 (100) — | A-5 (100) — | B-1 (100) — |
| | Thickness (mm) | 19 | 19 | 19 | 19 | 19 | 19 | 19 | 19 |
| | Crack (mm) | 2.9 | 3.8 | 5.7 | 0.5 | 1.9 | 0 | 0 | 1.9 |
| | Average coefficient of expansion of foamed resin | 1.5 | 1.5 | 1.5 | 1.2 | 2.5 | 1.4 | 2.1 | 1.5 |
| | Continuous porosity (%) | 30.2 | 27 | 19 | 41.0 | 15.0 | 31.0 | 27.0 | 3.2 |
| | Amount of air permeability ($cm^3/cm^2 \cdot s$) | 14.4 | 5.7 | 2.9 | 43.2 | 1.2 | 45.3 | 1.5 | 0.1 |
| | Interface between outer layer and inner layer | Partially adhered | Partially adhered | Partially adhered | Partially adhered | Partially adhered | Partially adhered | Partially adhered | Fully adhered |
| Evaluation | Maximum sound absorption frequency (Hz) | 2500 | 2500 | 2250 | 2500 | 2000 | 2250 | 3150 | 4000 |
| | Maximum sound absorption (%) | 75 | 65 | 61 | 92 | 51 | 92 | 53 | 8 |
| | 1000 Hz sound insulation (dB) | 17 | 18 | 19 | 6 | 19 | 5 | 18 | 17 |
| | Heat insulation (Air-impermeable layer side surface temperature ° C.) | 42 | 42 | 43 | 49 | 41 | 50 | 32 | 40 |
| | Durability (inside appearance evaluation) | Good | Good | Good | Poor | Good | Poor | Good | Good |

Examples 1 to 12 and Comparative Examples 1 to 5

Table 2 lists the results of evaluating the laminated structures D-1 to D-12, and it was found that the maximum sound absorption coefficient of Examples 1 to 12 was high. Moreover, these Examples displayed high sound insulation performance and had a good result in terms of heat transfer where the inner surface temperature was low. On the other hand, for Comparative Examples 1 and 3, the amount of air permeability of the foam was high. As a result, the maximum sound absorption coefficient was low, and the sound insulation performance was poor. Moreover, Comparative Examples 1 and 3 had a problem in terms of durability that the foamed layer was cracked. For Comparative Examples 2, 4 and 5, the resin inner layer had a low amount of air permeability or even no air permeability. As a result, the inner surface temperature was low in terms of heat transfer, but the maximum sound absorption coefficient was low.

Production Examples of Air-Impermeable Resin Outer Layers (C-5 to C-8)

Figure 7:
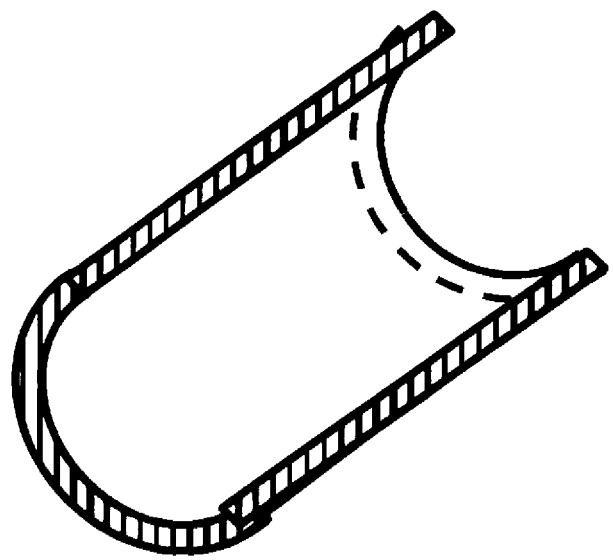
FIG. 7 schematically illustrates a shape of a component for producing an outer layer of a present embodiment.

A semi-cylindrical shaped product with an outer diameter of 60 mm, an inner diameter of 59 mm, a thickness of 1 mm, and a length of 300 mm as illustrated in FIG. 7 was shaped by injection molding using a polyamide 6 resin (UBE Nylon "1022B" produced by Ube Industries, Ltd). A mold whose cavity was in the shape of the shaped product was prepared, and shaping was performed with three side gates. The shaping was performed using an injection molding machine (Toshiba EC-130S), under conditions of a barrel temperature of 250° C., a mold temperature of 100° C., an injection pressure of 40 MPa, an injection time of 2.5 seconds, a holding pressure of 80 MPa for 15 seconds, and a cooling time of 60 seconds, and gate cutting was performed to obtain an outer layer (C-5).

An extruder was used to perform heated melt kneading of 60 mass % of polyphenylene ether-based resin (product name: Xyron TYPE S201A; produced by Asahi Kasei Corporation; surface tension at 20° C.: 40 mN/m), 18 mass % of a non-halogen flame retardant (bisphenol A-bis(diphenylphosphate) (BBP)), 10 mass % of high impact polystyrene resin (HIPS) having a rubber concentration of 6 mass % (rubber component content of 0.6 mass % in base material resin), and 12 mass % of general-purpose polystyrene resin (PS) (product name: GP685; produced by PS Japan Corporation). A strand was discharged from a cylindrical extrusion die with a hole of 2 mm and was pelletized by a pelletizer to obtain pellets with a length of 2 mm. Shaping was performed using the same mold and injection molding machine as the outer layer (C-5) in the same manner at a barrel temperature of 240° C. and a mold temperature of 75° C. to obtain an outer layer (C-6).

Shaping was performed using pellets of a polycondensate of ethylene glycol, isophthalic acid, and terephthalic acid (isophthalic acid content: 2 mass %) and the same mold and injection molding machine as the outer layer (C-5) in the same manner at a barrel temperature of 280° C. and a mold temperature of 100° C. to obtain an outer layer (C-7).

Shaping was performed using a high melt tension (HMS) polypropylene resin (produced by Borealis; model name: "WB135" pellet) and the same mold and injection molding machine as the outer layer (C-5) in the same manner at a barrel temperature of 260° C. and a mold temperature of 80° C. to obtain an outer layer (C-8).

Production Example of Structure (D-18)

The obtained resin particles A-2 were loaded into an autoclave again, and absorption of 4 MPa carbon dioxide gas was carried out for 3 hours at 10° C. Using a semi-cylindrical mold for foam shaping whose mold cavity had an outer diameter of 60.5 mm, an inner diameter of 44 mm, and a length of 300 mm, foam shaping was performed by inserting the outer layer (C-1) into the mold cavity, closing the mold, filling the space of the cavity with the obtained resin particles (A-2) that had been impregnated with carbon dioxide gas, and blowing steam at 150° C. for 30 seconds from the side of the cavity opposite to the inserting side. A shaped product in which the outer layer (C-1) and the foamed resin particles A-2 had been fused was obtained. The thickness of the resin inner layer was 15 mm. The crack was 1.5 mm.

When the resin foam shaped product was cut and observed, an assembly of polyamide resin foam particles having numerous closed cells with a cell diameter of 200 μm to 400 μm had been formed. The presence of continuous pores was confirmed from the measurement value for airflow resistance. Two of such shaped products were prepared.

The highest parts of the recesses of the two shaped products were brought into contact with a hot plate, which had been heated to 270° C., for 20 seconds at a pressing pressure of 0.1 MPa so that the recesses of the shaped products faced each other, and then the hot plate was removed and the highest parts of the recesses of the two shaped products were fused with each other at a pressing pressure of 0.1 MPa to obtain a laminated structure (D-18) having a through hollow structure. Table 3 lists the measurement results of the laminated structure.

Production Example of Structure (D-19)

Shaping and hot plate welding were performed in the same manner as for D-18, with the exception that a semi-cylindrical mold for foam shaping whose mold cavity had an outer diameter of 60.5 mm, an inner diameter of 49 mm, and a length of 300 mm was used. A laminated structure D-19 having a through hollow structure was obtained. Table 3 lists the measurement results of the laminated structure.

Production Examples of Structures (D-20 to D-25)

Foam shaping and hot plate welding were performed using the air-impermeable resin outer layer and resin particles listed in Table 3 with the mold for foam shaping used for D-1 to obtain laminated structures D-20 to D-25 having a through hollow structure. Particles obtained by loading all the resin particles except A-1 into an autoclave again and carrying out absorption of 4 MPa carbon dioxide gas for 3 hours at 10° C. were used. Note that only D-24 was obtained by performing the shaping with a crack of 0 mm. Table 3 lists the measurement results of the laminated structures.

Production Example of Structure (D-26)

A semi-cylindrical shaped product with an outer diameter of 60 mm, an inner diameter of 56 mm, a thickness of 4 mm, and a length of 300 mm was shaped by injection molding using a polyamide 6 resin (UBE Nylon "1022B" produced by Ube Industries, Ltd), where the shaping conditions were the same as that of the resin outer layer A-1, only with the exception that the cooling time was extended to 3 minutes to obtain a shaped product having a shaping thickness of 4 mm. Two sets of such shaped products were prepared to obtain a structure D-25 having a through hollow structure in the same manner as for D-1. Table 3 lists the measurement results of the laminated structure.

Production Example of Structure (D-27)

A semi-cylindrical mold for foam shaping whose mold cavity had an outer diameter of 60.5 mm, an inner diameter of 44 mm, and a length of 300 mm was used, the outer layer (C-1) was inserted into the mold cavity, the mold was closed, and the space of the mold cavity was foam-filled with urethane foam mixed raw materials (100 parts of polyether polyol (average molecular weight: 7000, number of functional groups: 3, hydroxyl value: 24, EO rate: 17%), catalyst; 2 parts of trimethylenediamine, 1 part of blowing agent (water), MDI (methylene diphenyl diisocyanate)) (NCO %: 29.9%)). Shaping was performed without applying heat to the mold. Two sets of such shaped products were prepared, and welding was performed in the same manner as D-1 to obtain a structure D-10 having a through hollow structure. Table 3 lists the measurement results of the laminated structure.

TABLE 3

| | | | Example 13 | Example 14 | Example 15 | Example 16 | Example 17 | Example 18 | Comparative Example 6 | Comparative Example 7 | Comparative Example 8 | Comparative Example 9 |
|---|---|---|---|---|---|---|---|---|---|---|---|---|
| | Laminated structure | | D-18 | D-19 | D-20 | D-21 | D-22 | D-23 | D-24 | D-25 | D-26 | D-27 |
| Laminate | Air-impermeable outer layer | Type of resin | C-5 | C-5 | C-5 | C-6 | C-7 | C-8 | C-5 | C-5 | — | C-5 |
| | | Outer layer thickness (mm) | 1 | 1 | 1 | 1 | 1 | 1 | 1 | 1 | 4 | 1 |
| | | Air-impermeable | Yes | Yes | Yes | Yes | Yes | Yes | Yes | Yes | Yes | Yes |
| | Foamed resin layer | Type of resin (ratio %) | A-2 (100) | A-2 (100) | B-1 (70) | A-3 (100) | A-4 (100) | A-5 (100) | A-2 (100) | B-1 (100) | — | Urethane foam (100) |
| | | | — | — | A-1 (30) | — | — | — | — | — | — | — |
| | | Thickness (mm) | 15 | 10 | 15 | 15 | 15 | 15 | 15 | 15 | — | 15 |
| | | Crack (mm) | 1.5 | 1.0 | 1.5 | 1.5 | 1.5 | 1.5 | 0 | 1.5 | — | — |
| | | Amount of air permeability (cm$^3$/cm$^2$ · s) | 34.3 | 33.4 | 23.2 | 30.3 | 31.0 | 34.6 | 43.1 | 0.2 | 0 | 70.9 |
| | | Interface between outer layer and inner layer | Partially adhered | Partially adhered | Partially adhered | Partially adhered | Partially adhered | Partially adhered | Partially fused | Fully adhered | — | Partially adhered |
| Evaluation | | Maximum noise attenuation frequency (Hz) | 2,000 | 4,000 | 2,000 | 2,000 | 2,000 | 2,000 | 2,000 | 3,150 | 4,000 | 4,000 |
| | | Maximum noise attenuation (dB) | 38 | 26 | 25 | 34 | 35 | 37 | 39 | 8 | 5 | 42 |
| | | Noise (sound insulation) (dB) | 27 | 22 | 30 | 30 | 28 | 29 | 38 | 36 | 35 | 42 |
| | | Heat insulation (inner surface temperature) (° C.) | 45 | 55 | 58 | 41 | 51 | 48 | 60 | 50 | 90 | 40 |
| | | Durability (inside appearance evaluation) | Good | Good | Good | Good | Good | Good | Poor | Good | Good | Poor |

Examples 13 to 18 and Comparative Examples 6 to 9

Table 3 lists the results of evaluating the laminated structures D-18 to D-23, and it was found that the maximum noise attenuation of Examples 13 to 18 was high. Moreover, these Examples displayed high sound insulation performance in terms of the sound coming out of the tube, and had a good result in terms of heat transfer where the inner surface temperature was low. On the other hand, for Comparative Example 6, the amount of air permeability of the foam was high. As a result, the maximum noise attenuation was low, and the sound insulation performance was poor because the sound coming out of the tube was loud. Moreover, Comparative Example 6 had a problem in terms of durability that the beads spilled out of the tube. For Comparative Example 7, the resin inner layer had no air permeability. As a result, the inner surface temperature was low in terms of heat transfer, but the maximum noise attenuation was low. Additionally, there was no change in appearance even air was continuous blown. Comparative Example 8 did not have a foamed resin inner layer, and therefore the inner surface temperature was high in terms of heat transfer, and the maximum noise attenuation was low. Comparative Example 9 used a urethane foam that did not contain any foam particles. As a result, the inner surface temperature was high in terms of heat transfer, the maximum noise attenuation was high, and the sound insulation was low with much sound leakage. Moreover, the urethane foam was scraped or partially torn on the inner surface after continuous air blowing, so that the durability was poor.

INDUSTRIAL APPLICABILITY

The laminated structure of the present embodiment has high heat insulation, a light weight but high strength, and high sound absorption performance.

Application examples of the laminated structure of the present embodiment include members that are required to have air permeability and are used to reduce wind noise when air passes through to propagate driving sound in vehicles and aircraft such as automobiles, trains, and railroad trains that are required to be lightweight and quiet. In particular, the laminated structure can be used as various automobile intake and exhaust components such as a ventilation component that ventilate an engine in an automobile engine room that requires independence, heat deformation resistance, and heat insulation, an exhaust component for exhausting gas generated by an engine, a ventilation component for introducing outside air into the interior of an automobile, and an exhaust component for exhausting air inside an automobile to the outside.

Not limited to automobiles, the laminate of the present embodiment can also be suitably used in air-conditioning equipment such as air conditioners that are required to be quiet, refrigerators, heat pumps, components forming an air passage for intake and exhaust, and ventilation components for intake and exhaust used in various household electric appliances, building materials, and the like.

REFERENCE SIGNS LIST

1: enclosure
2: speaker
3: microphone (intake port side)
4: microphone (discharge port side)
5: laminated structure
6: laminated structure
7: speaker
8: iron plate
9: iron plate
10: sealing material
11: sound level meter

The invention claimed is:

1. A laminated structure comprising
a foamed resin layer having continuous pores containing fused resin foam particles, and
an air-impermeable outer layer provided on one side of the foamed resin layer, wherein
the laminated structure has an amount of air permeability of 2.5 cm$^3$/(cm$^2$·s) to 40 cm$^3$/(cm$^2$·s), where the amount of air permeability of the laminated structure is obtained by measuring an amount of air permeability from a side surface of a substantially columnar sample cut out from the laminated structure to have a diameter of 41.5 mmϕ by the Frazier method with the foamed resin layer being placed at an air introduction side, and
the foamed resin layer has a porosity of 15% to 40.1%.

2. The laminated structure according to claim 1, wherein the resin foam particles have a recessed external part.

3. The laminated structure according to claim 2, wherein in an orthogonal projection of the resin foam particles in which the recessed external part can be confirmed, the recessed external part has an area of 10% or more of a total area of the orthogonal projection.

4. The laminated structure according to claim 1, wherein the laminated structure contains a thermoplastic resin having a surface tension of 37 mN/m to 60 mN/m at 20° C.

5. The laminated structure according to claim 1, wherein the foamed resin layer comprises a shaped body which contains the resin foam particles having an average particle diameter of 1.0 mm to 4.0 mm, where a ratio $\rho_0/\rho_1$ of a density $\rho_0$ of the resin and a true density $\rho_1$ of the resin foam particles is 2 to 20, a ratio $\rho_1/\rho_2$ of a true density $\rho_1$ of the resin foam particles and a bulk density $\rho_2$ of the resin foam particles is 1.5 to 4.0, and the resin foamed particles are fused to one another.

6. The laminated structure according to claim 1, wherein either or both of the air-impermeable outer layer and the foamed resin layer contain at least one resin selected from the group consisting of heat-resistant acrylic resin, polyester-based resin, polycarbonate, polypropylene resin, polyphenylene ether resin, and polyamide resin.

7. The laminated structure according to claim 1, wherein the air-impermeable outer layer comprises an air-impermeable resin containing no foamed resin.

8. The laminated structure according to claim 1, wherein the air-impermeable outer layer and the foamed resin layer are partially adhered to one another.

9. The laminated structure according to claim 1, wherein the laminated structure is formed of a plurality of parts each consisting of the air-impermeable outer layer and the foamed resin layer, and the air-impermeable outer layers and the foamed resin layers of the parts have a welded portion.

10. The laminated structure according to claim 1, which is a hollow structure for automobiles.

11. The laminated structure according to claim 1, wherein the air-impermeable outer layer is the exterior of an automobile.

12. The laminated structure according to claim 1, which is a cover for automotive power or automotive electronics.

* * * * *